(12) United States Patent
Tariki

(10) Patent No.: US 6,417,886 B1
(45) Date of Patent: *Jul. 9, 2002

(54) IMAGE TRANSMISSION APPARATUS AND METHOD AND IMAGE TRANSMISSION SYSTEM

(75) Inventor: Motoi Tariki, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,242

(22) Filed: Feb. 20, 1998

(30) Foreign Application Priority Data

Feb. 21, 1997 (JP) ............................................. 9-037642

(51) Int. Cl.$^7$ .................................................. H04N 7/00

(52) U.S. Cl. ................................ 348/384.1; 348/14.12; 348/723; 348/565

(58) Field of Search ............................... 348/723, 385.1, 348/563, 14.12, 564, 14.13, 565, 566, 567, 568, 584, 588, 143, 157, 158, 159, 384.1; H04N 7/00, 7/24, 7/18

(56) References Cited

U.S. PATENT DOCUMENTS 5,481,297 A * 1/1996 Cash et al. .................... 348/13

FOREIGN PATENT DOCUMENTS

JP 7-236136 * 9/1995 ............ H04N/7/24

* cited by examiner

*Primary Examiner*—David E. Harvey
(74) *Attorney, Agent, or Firm*—Fitzpatrick, Cella, Harper & Scinto

(57) ABSTRACT

An image receiving unit receives a first image signal transmitted from a first image transmitting unit and a second image signal transmitted from a second image transmitting unit, synthesizes the first and second image signals, and displays them on the same display screen. The image receiving unit transmits information about display areas of the first and second image signals, i.e., image plane setting information, to each image transmitting unit. In accordance with the image plane setting information, each image transmitting unit reduces the data amount of a display area the first and second image signals are displayed in an overlap manner, prior to transmitting the first and second image signals. Also in accordance with the image plane setting information, each image transmitting unit processes the first or second image signals so as to match a display area thereof, prior to transmitting the first and second image signals.

6 Claims, 14 Drawing Sheets

IMAGE TRANSMISSION APPARATUS AND METHOD AND IMAGE TRANSMISSION SYSTEM

BACKGROUND OF THE INVENTION

1. Field of the Invention

The present invention relates to an image transmission apparatus and method and an image transmission system, more particularly to techniques of displaying image signals transmitted from a plurality of apparatuses on the same screen of a remotely located apparatus.

2. Related Background Art

A system is being developed in which images taken with a plurality of cameras are displayed at the same time on the screen of a single monitor located remotely from the cameras, by using a picture-in-picture method or the like. Such a system is widely used for monitoring or other applications, and all image signals picked up by cameras are transmitted via wired or wireless transmission paths to the monitor. Such an image transmission system will be described with reference to FIGS. 1 and 2.

FIGS. 1 and 2 are schematic diagrams showing conventional image transmission systems. FIG. 1 shows a system using wired transmission paths, whereas FIG. 2 shows a system using wireless transmission paths.

In FIG. 1, a first camera unit 102 and a second camera unit 103 are connected via wired transmission paths 106 to a monitor unit 101.

The monitor unit 101 receives an image signal generated by the first camera unit 102 which picked up an image of an object 104, and an image signal generated by the second camera unit 103 which picked up an image of an object 105. These image signals are synthesized to display it on the same screen. In the example shown in FIG. 1, the image of the object 104 picked up with the first camera unit 102 is displayed in a main screen area of the monitor unit 101, whereas the image of the object 105 picked up with the second camera unit 103 is displayed in a partial screen area of the monitor unit 101, being superposed upon the image of the object 104. In the following, a screen area occupying 50% or more of the effective display area of the screen of the monitor unit 101 is called a main image plane, whereas the screen area not occupied by the main image plane is called a sub image plane.

In FIG. 2, a monitor unit 101, a first camera unit 102, and a second camera unit 103 each equipped with a wireless communication unit 206. The first and second camera units 102 and 103 transmit image signals from the communication units 206 to the monitor unit 101. The monitor unit 101 receives an image signal generated by the first camera unit 102 which picked up an image of an object 104, and an image signal generated by the second camera unit 103 which picked up an image of an object 105. These image signals are synthesized to display it on the same screen. In the example shown in FIG. 2, the monitor unit 101 displays the image of the subject 104 picked up with the first camera unit 102, in the main image plane, and displays the image of the subject 105 picked up with the second camera unit 103, in the sub image plane being superposed on the main image plane.

Next, the structures of the monitor unit 101, first camera unit 102 and second camera unit 103 will be described with reference to FIG. 3.

In the first camera unit 102 shown in FIG. 3, a camera unit A103 picks up an optical image of the subject 104 to generate an electrical signal of a predetermined type. A signal processing unit A302 digitizes the electrical signal supplied from the camera unit A301 to convert it into an image signal of a predetermined format. The image signal converted by the signal processing unit A302 is an image signal matching a size of an effective display area of the monitor unit 101. A transmitting unit A303 converts the image signal processed by the signal processing unit A302 into a signal having a data format suitable for wired or wireless transmission.

In the second camera unit 103, a camera unit B304 picks up an optical image of the subject 105 to generate an electrical signal of a predetermined type. A signal processing unit B305 digitizes the electrical signal supplied from the camera unit B304 to convert it into an image signal of a predetermined format. Similar to the case of the signal processing unit A302, the image signal converted by the signal processing unit B305 is an image signal matching a size of an effective display area of the monitor unit 101. A transmitting unit B306 converts the image signal processed by the signal processing unit B305 into a signal having a data format suitable for wired or wireless transmission.

In the monitor unit 101, a receiving unit 307 receives image signals transmitted from the transmitting units A303 and B306 via wired or wireless transmission paths. A signal processing unit C308 converts the image signal received by the receiving unit 307 into a signal of a type capable of being displayed on a display unit 309. Specifically, the signal processing unit C308 convert an image signal transmitted from each camera unit into an image signal matching the size and area of an image plane in which the image is displayed. The display unit 309 displays image signals transmitted from the first and second camera units 102 and 103.

As above, in order to display the image signals transmitted from a plurality of camera units 102 and 103 on the same display screen of the image transmission system shown in FIG. 1 or FIG. 2, each camera unit transmits to the monitor unit 101 an image signal matching the size of an effective display area of the monitor unit 101. The monitor unit 101 thins the image signals so as to make them match the sizes of display areas of the main and sub image planes, and synthesizes them so as to display them on the same display screen in a superposed manner.

In order to display image signals on the main and sub image planes in a superposed manner, the monitor unit 101 processes the image signals so as not to display the image signals of the main image plane superposed upon the sub image plane. However, the conventional camera unit 102 transmits all the image signals of the main image plane, including the image signals superposed upon the sub image plane, to the monitor unit 101. Since the camera unit 102 transmits the image signals not displayed on the camera unit 101, a use efficiency of a transmission path is degraded and a transmission power of the camera unit 101 is consumed wastefully.

Furthermore, the monitor unit 101 thins the image signal transmitted from the camera unit 103 so as to make it match the size of a display area of the sub image plane and thereafter the thinned image signal is synthesized with the image signal of the main image plane. However, the conventional camera unit 101 transmits the monitor unit 101 the image signal matching not the display area of the sub image plane but the effective display area of the monitor unit 101. Since the camera unit 103 transmits all the image signals including those which are thinned by the monitor unit 101, a use efficiency of a transmission path is degraded and a transmission power of the camera unit 102 is consumed wastefully.

The above disadvantages are more conspicuous for wireless transmission paths having a limited amount of transmission data, than for wired transmission paths.

SUMMARY OF THE INVENTION

An object of the present invention is to solve the above-described problems.

Another object of the invention is to provide an image transmission apparatus capable of improving a use efficiency of transmission paths and reducing a transmission power to be consumed.

As a preferred embodiment for such objects, the invention discloses an image transmitting apparatus, comprising: (a) receiving means for receiving first and second image signals transmitted from an external apparatus; (b) display means for displaying the first and second image signals on a same display screen; and (c) transmitting means for transmitting, to the external apparatus, information regarding a display area of the second image signal.

As another embodiment, the invention discloses an image transmitting apparatus, comprising: (a) receiving means for receiving first and second image signals transmitted from an external apparatus; (b) signal processing means for synthesizing the first and second image signals; and (c) transmitting means for transmitting, to the external apparatus, information regarding an area to be synthesized by the signal processing means.

As another embodiment, the invention discloses an image transmitting apparatus, comprising: (a) input means for inputting an image signal; (b) signal processing means for reducing a data amount in a predetermined area of the image signal; and (c) transmitting means for transmitting the image signal processed by the signal processing means to an external apparatus, wherein the predetermined area is an area of the external apparatus where the image signal and another image signal are displayed in an overlap manner.

As another embodiment, the invention discloses an image transmitting apparatus, comprising: (a) input means for inputting an image signal; (b) converting means for converting the image signal into an image signal having a predetermined size; and (c) transmitting means for transmitting the image signal converted by the converting means to an external apparatus, wherein the predetermined size is a size of an area of the external apparatus where the image signal and another image signal are displayed.

As another embodiment, the invention discloses an image transmitting apparatus, comprising: (a) input means for inputting an image signal; (b) signal processing means for reducing a data amount in a predetermined area of the image signal; and (c) transmitting means for transmitting the image signal processed by the signal processing means to an external apparatus, wherein the predetermined area is an area of the external apparatus where the image signal and another image signal are synthesized.

As another embodiment, the invention discloses an image transmitting apparatus, comprising: (a) input means for inputting an image signal; (b) converting means for converting the image signal into an image signal having a predetermined size; and (c) transmitting means for transmitting the image signal converted by the converting means to an external apparatus, wherein the predetermined size is a size of an area of the external apparatus where the image signal and another image signal are synthesized.

As another embodiment, the invention disclosed an image transmitting apparatus, comprising: (a) first storage means for storing a first image signal received via a transmission path; (b) second storage means for storing a second image signal received via the transmission path; and (c) synthesizing means for reading the first and second image signals stored in the first and second storage means and synthesizing the read first and second image signals, wherein the first and second image signals are signals processed so as to match a size of an area to be synthesized by the synthesizing means.

Another object of the invention is to provide an image transmission method capable of improving a use efficiency of transmission paths and reducing a transmission power to be consumed.

As a preferred embodiment for such objects, the invention discloses an image transmitting method, comprising the steps of: (a) receiving first and second image signals transmitted from an external apparatus; (b) displaying the first and second image signals on a same display screen; and (c) transmitting, to the external apparatus, information regarding a display area of the second image signal.

As another embodiment, the invention discloses an image transmitting method, comprising the steps of: (a) receiving first and second image signals transmitted from an external apparatus; (b) synthesizing the first and second image signals; and (c) transmitting, to the external apparatus, information regarding an area of the second image signal to be synthesized.

As another embodiment, the invention disclosed an image transmitting method, comprising the steps of: (a) inputting an image signal; (b) reducing a data amount in a predetermined area of the image signal; and (c) transmitting the image signal with a reduced data amount of the predetermined area, wherein the predetermined area is an area of the external apparatus where the image signal and another image signal are displayed in an overlap manner.

As another embodiment, the invention discloses an image transmitting method, comprising the steps of: (a) inputting an image signal; (b) converting the image signal into an image signal having a predetermined size; and (c) transmitting the converted image signal to an external apparatus, wherein the predetermined size is a size of an area of the external apparatus where the image signal and another image signal are displayed.

As another embodiment, the invention discloses an image transmitting method, comprising the steps of: (a) inputting an image signal; (b) reducing a data amount in a predetermined area of the image signal; and (c) transmitting the image signal with a reduced data amount of the predetermined area to an external apparatus, wherein the predetermined area is an area of the external apparatus where the image signal and another image signal are synthesized.

As another embodiment, the invention discloses an image transmitting method, comprising the steps of: (a) inputting an image signal; (b) converting the image signal into an image signal having a predetermined size; and (c) transmitting the converted image signal to an external apparatus, wherein the predetermined size is a size of an area of the external apparatus where the image signal and another image signal are synthesized.

As another embodiment, the invention discloses an image transmitting method, comprising the steps of: (a) storing a first image signal received via a transmission path in a first memory; (b) storing a second image signal received via the transmission path in a second memory; and (c) reading the first and second image signals stored in the first and second memories and synthesizing the read first and second image signals, wherein the first and second image signals are signals processed so as to match a size of an area to be synthesized.

Another object of the invention is to provide an image transmission system capable of improving a use efficiency of transmission paths and reducing a transmission power to be consumed.

As a preferred embodiment for such objects, the invention discloses an image transmitting system, comprising: (a) receiving means for receiving first and second image signals transmitted from an external apparatus; (b) display means for displaying the first and second image signals on a same display screen; and (c) transmitting means for transmitting, to the external apparatus, information regarding a display area of the second image signal.

As another embodiment, the invention discloses an image transmitting system, comprising: (a) receiving means for receiving first and second image signals transmitted from an external apparatus; (b) signal processing means for synthesizing the first and second image signals; and (c) transmitting means for transmitting, to the external apparatus, information regarding an area to be synthesized by the signal processing means.

As another embodiment, the invention discloses an image transmitting system, comprising: (a) input means for inputting an image signal; (b) signal processing means for reducing a data amount in a predetermined area of the image signal; and (c) transmitting means for transmitting the image signal processed by the signal processing means to an external apparatus, wherein the predetermined area is an area of the external apparatus where the image signal and another image signal are displayed in an overlap manner.

As another embodiment, the invention discloses an image transmitting system, comprising: (a) input means for inputting an image signal; (b) converting means for converting the image signal into an image signal having a predetermined size; and (c) transmitting means for transmitting the image signal converted by the converting means to an external apparatus, wherein the predetermined size is a size of an area of the external apparatus where the image signal and another image signal are displayed.

As another embodiment, the invention discloses an image transmitting system, comprising: (a) input means for inputting an image signal; (b) signal processing means for reducing a data amount in a predetermined area of the image signal; and (c) transmitting means for transmitting the image signal processed by the signal processing means to an external apparatus, wherein the predetermined area is an area of the external apparatus where the image signal and another image signal are synthesized.

As another embodiment, the invention discloses an image transmitting system, comprising: (a) input means for inputting an image signal; (b) converting means for converting the image signal into an image signal having a predetermined size; and (c) transmitting means for transmitting the image signal converted by the converting means to an external apparatus, wherein the predetermined size is a size of an area of the external apparatus where the image signal and another image signal are synthesized.

As another embodiment, the invention discloses an image transmitting system, comprising: (a) first storage means for storing a first image signal received via a transmission path; (b) second storage means for storing a second image signal received via the transmission path; and (c) synthesizing means for reading the first and second image signals stored in the first and second storage means and synthesizing the read first and second image signals, wherein the first and second image signals are signals processed so as to match a size of an area to be synthesized by the synthesizing means.

Still other objects of the present invention, and the advantages thereof, will become fully apparent from the following detailed description of the embodiments.

DETAILED DESCRIPTION OF THE PREFERRED EMBODIMENTS

The preferred embodiments of the present invention will now be described in detail hereinafter with reference to the accompanying drawings.

1. First Embodiment

Figure 1:
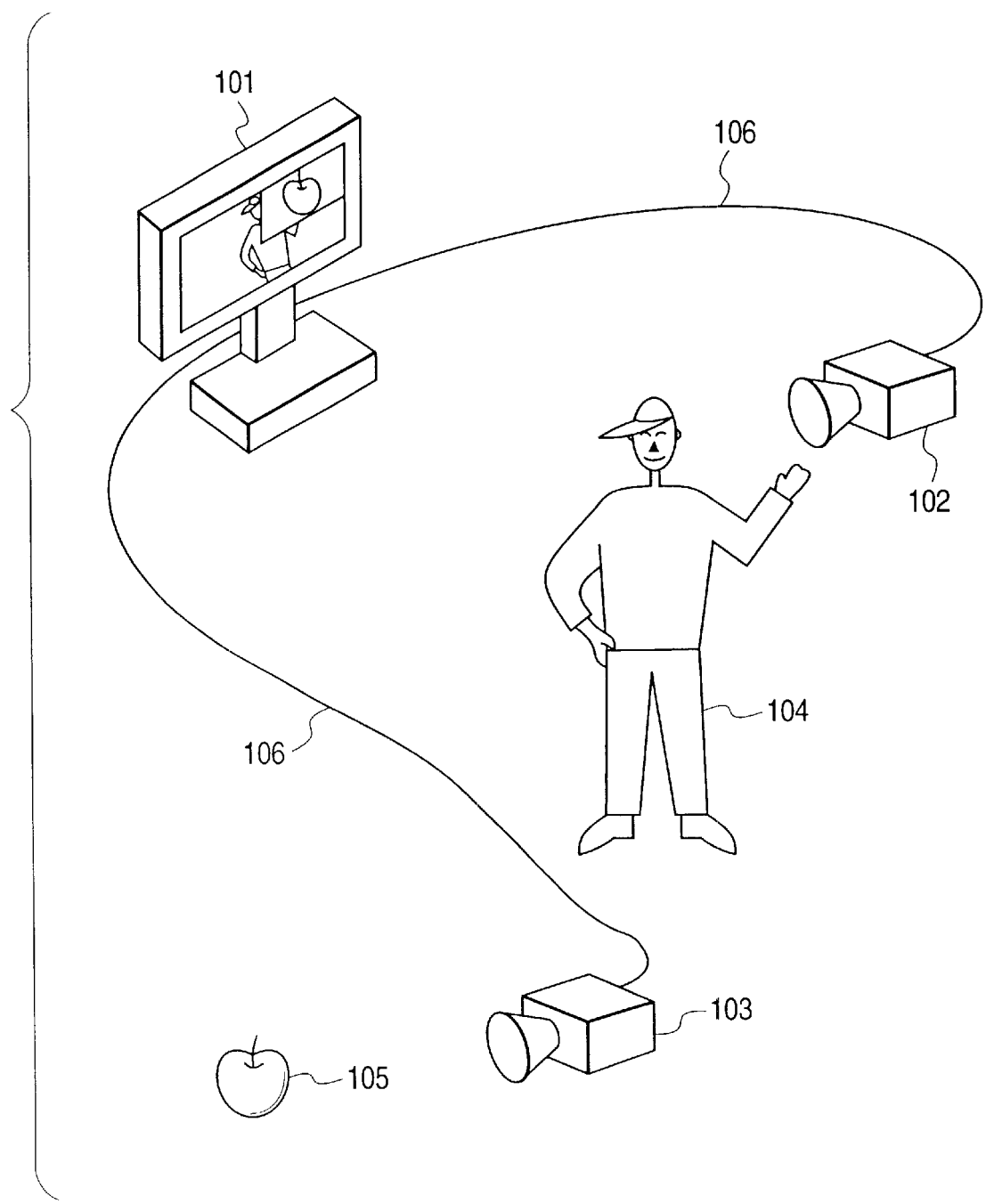
FIG. 1 is a block diagram illustrating the structure of a conventional image transmission system using wired transmission paths.
Figure 2:
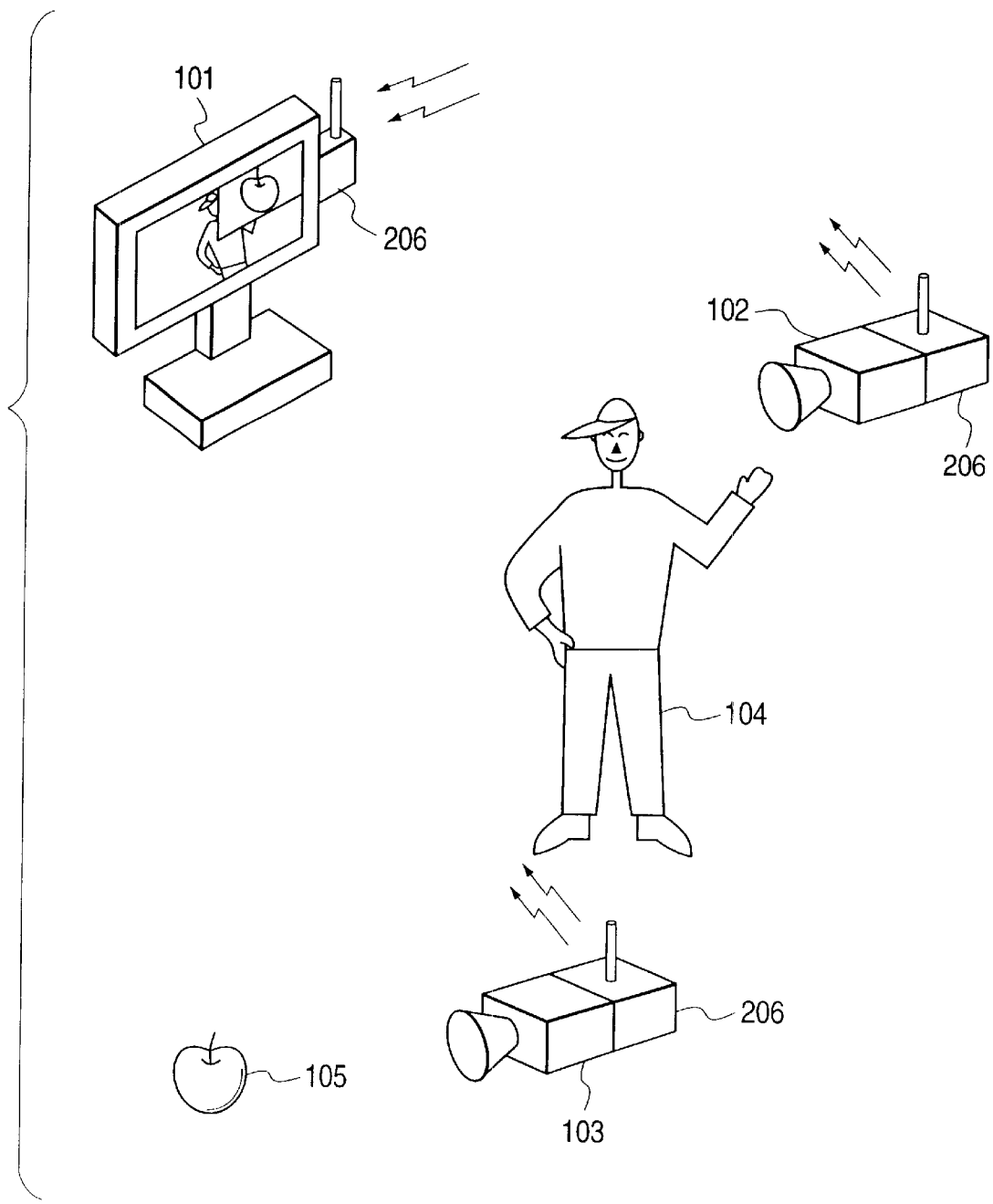
FIG. 2 is a block diagram illustrating the structure of a conventional image transmission system using wireless transmission paths.
Figure 3:
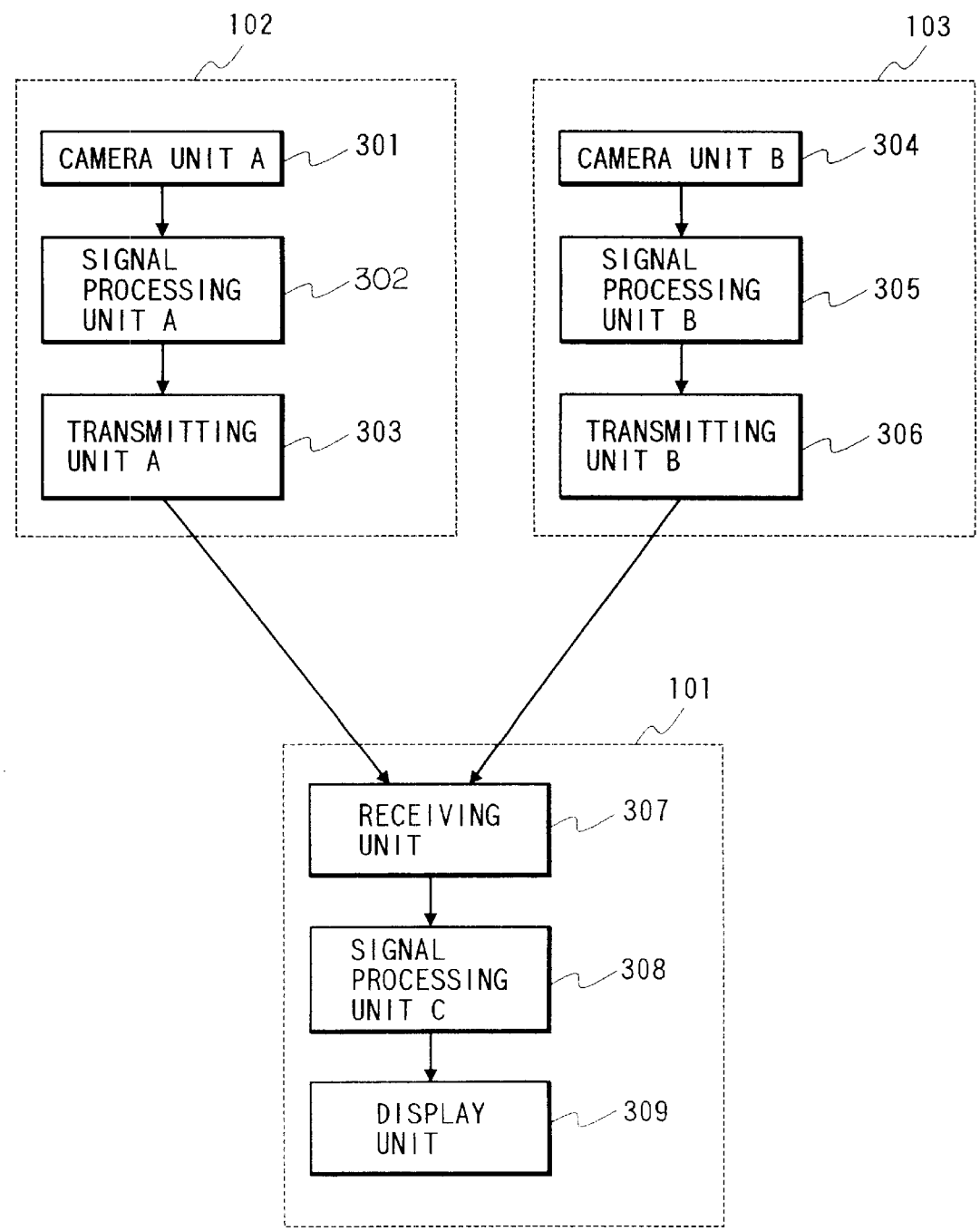
FIG. 3 is a block diagram illustrating the structure of each unit constituting a conventional image transmission system.
Figure 4:
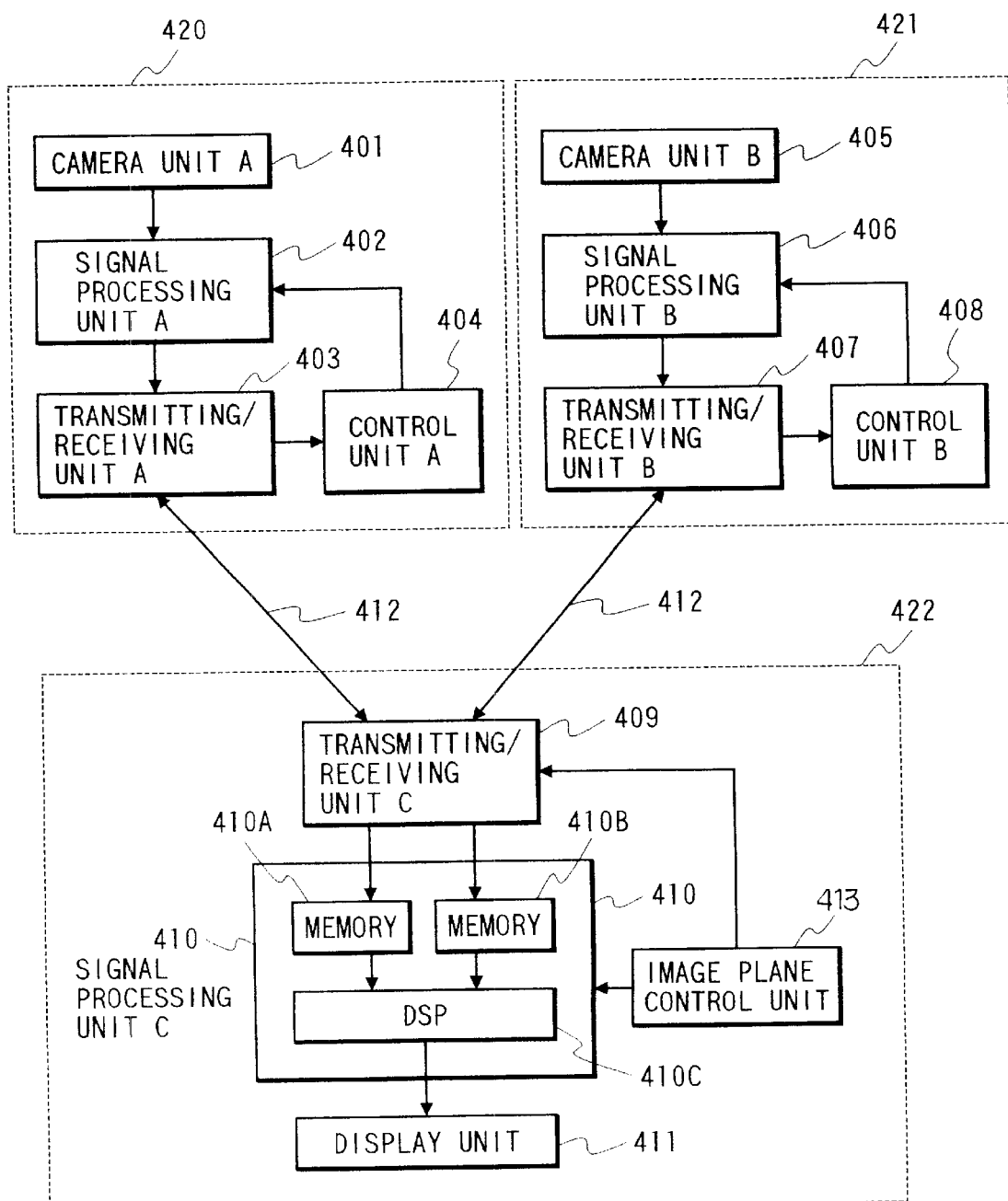
FIG. 4 is a block diagram showing the structure of an image transmission system according to a first embodiment.

FIG. 4 is a block diagram showing the structure of an image transmission system according to the first embodiment of the invention.

In FIG. 4, reference numeral 420 represents a first image transmitting unit, reference numeral 421 represents a second image transmitting unit, and reference numeral 422 represents an image receiving unit.

In the first image transmitting unit 420, a camera unit A401 is connected to a signal processing unit A402, the camera unit A401 picking up an optical image of an object and generating a predetermined electrical signal. The signal processing unit A402 digitizes the electrical signal supplied from the camera unit A401 to convert it into an image signal of a predetermined format. An output of the signal processing unit A402 is supplied to a transmitting/receiving unit A403. This transmitting/receiving unit A403 converts the image signal processed by the signal processing unit A402 into an image signal having a data type suitable for wired or wireless transmission. The image signal processed by the transmitting/receiving unit A403 is transmitted via a wired or wireless transmission path 412 to the image receiving unit 422. The transmitting/receiving unit A403 is also connected to a control unit A404 whose output is supplied to the signal processing unit A402 and is used for the process control of the signal processing unit A402.

If the image picked up with the camera unit A401 is to be displayed on the main image plane, the controller A404 controls the image signal process to be performed by the signal processing unit A402, in accordance with information about the size and position of a display area of the sub image plane. On the other hand, if the image picked up with the camera unit A401 is to be displayed on the sub image plane, the controller A404 controls the image signal process to be performed by the signal processing unit A402, to thereby generate an image signal matching the size of the effective display area of the image receiving unit 422. In this embodiment, information about the main and sub image planes is called "image plane setting information". The image plane setting information includes information indicating which image transmitting unit transmits image signals for the main or sub image plane, and information about the size and position of the display area of each of the main and sub image planes. The image plane setting information is transmitted from the image receiving unit 422.

In the second image transmitting unit 421, a camera unit B405 is connected to a signal processing unit B406, the camera unit B405 picking up an optical image of an object and generating a predetermined electrical signal. The signal processing unit B406 digitizes the electrical signal supplied from the camera unit B405 to convert it into an image signal of a predetermined format. An output of the signal processing unit B406 is supplied to a transmitting/receiving unit B407. This transmitting/receiving unit B407 converts the image signal processed by the signal processing unit B406 into an image signal having a data type suitable for wired or wireless transmission. The image signal processed by the transmitting/receiving unit B407 is transmitted via a wired or wireless transmission path 412 to the image receiving unit 422. The transmitting/receiving unit B407 is also connected to a control unit B408 whose output is supplied to the signal processing unit B406 and is used for the process control of the signal processing unit B406.

If the image picked up with the camera unit B405 is to be displayed on the main image plane, the control unit B408 controls the image signal process to be performed by the signal processing unit B406, in accordance with the image plane setting information about the sub image plane. On the other hand, if the image picked up with the camera unit B405 is to be displayed on the sub image plane, the control unit B408 controls the image signal process to be performed by the signal processing unit B406, to thereby generate an image signal matching the size of the effective display area of the image receiving unit 422. The image plane setting information is transmitted from the image receiving unit 422.

In the image receiving unit 422, a transmitting/receiving unit C409 receives image signals transmitted from the transmitting/receiving units A403 and B407 via a wired or wireless transmission path. The transmitting/receiving unit C409 is connected to a signal processing unit C410. This signal processing unit C410 converts the image signal received by the transmitting/receiving unit C409 into an image signal capable of being displayed on a display unit 411. An output of the signal processing unit C410 is supplied to the display unit 411. The display unit 411 can display the image signals transmitted from the first and second image transmitting units 420 and 421 on the same display screen. An image plane control unit 413 is connected to the transmitting/receiving unit C409 and to the signal processing unit C410. The image plane control unit 413 controls the display position of the sub image plane on the display unit 411 and generates the image plane setting information. The image plane setting information is supplied to the transmitting/receiving unit C409 and transmitted to the image transmitting units 420 and 421.

The signal processing unit C410 includes: a memory 410A for storing image signals received from the image transmitting unit 420 having the camera unit A401; a memory 410B for storing image signals received from the image transmitting unit 421 having the camera unit B405; and a digital signal processor (DSP) 410C for processing a plurality of image signals read from the two memories 410A and 410B in order to display them on the same display screen.

Next, the operation to be executed by the first embodiment constructed as above will be described. In the first embodiment, it is assumed that the image signal from the image transmitting unit 420 is displayed on the main image plane and the image signal from the image transmitting unit 421 is displayed on the sub image plane. In the third embodiment to follow, it is assumed that the size of the sub image plane is ¼ that of the main image plane and the display position of the sub image plane is at the upper right of the main image plane. Also in the first embodiment, it is assumed that the size of an image display area of the sub image plane is an integer multiple of the number of coding blocks used for coring the image signal into an image signal having a predetermined format. Also assumed in the first embodiment is that the image plane control unit 413 of the image receiving unit 422 determines image signals of which unit among a plurality of image transmitting units are displayed on the main or sub image plane, and also determines the size and position of a display area of each of the main and sub image planes.

First, the signal processing unit A402 of the image transmitting unit 420 converts the image signal picked up with the camera unit A401 into a digital signal having a predetermined format, and outputs it to the transmitting/receiving unit A403. The transmitting/receiving unit A403 transmits the image signal to the transmitting/receiving unit C409 of the image receiving unit 422 via the wired or wireless transmission path. Upon reception of this image signal, the transmitting/receiving unit C409 supplies the received image signal to the signal processing unit C410. The signal processing unit C410 stores the image signal transmitted from the image transmitting unit 420 into the memory 410A. Reading the image signal from the memory 410A is controlled by DSP 410C.

Similarly, the signal processing unit B406 of the image transmitting unit 421 converts the image signal picked up with the camera unit B405 into a digital signal having a predetermined format, and outputs it to the transmitting/receiving unit B407. The transmitting/receiving unit B407 transmits the image signal to the transmitting/receiving unit C409 of the image receiving unit 422 via the wired or wireless transmission path. Upon reception of this image signal, the transmitting/receiving unit C409 supplies the received image signal to the signal processing unit C410. The signal processing unit C410 stores the image signal transmitted from the image transmitting unit 421 into the memory 410B. Reading the image signal from the memory 410B is controlled by DSP 410C.

Prior to the communication with the image transmitting unit 420, the image receiving unit 422 of the first embodiment has already transmitted the image plane setting information generated by the image plane control unit 413 to the image transmitting unit 420. The transmitting/receiving unit A403 of the image transmitting unit 420 supplies the image plane setting information transmitted from the transmitting/receiving unit C409 to the signal processing unit A404.

In accordance with the received image plane setting information, the control unit A404 of the image transmitting unit 420 controls the signal processing unit A402. The signal processing unit A402 performs a thinning process for image signals masked by the sub image plane among the image signals picked up with the camera unit A401 (i.e., performs a process of deleting partially or wholly the image signals masked by the sub image plane), and supplies the thinned image signals to the transmitting/receiving unit A403. Therefore, in the first embodiment, of the image signals of the main image plane, a fraction or all of the image signals masked by the sub image plane are not transmitted to the image receiving unit 422.

DSP 410C of the image receiving unit 422 controls reading the image signals stored in the memories 410A and 410B. DSP 410C synthesizes images signals into image signals of one frame, and reconfigures the image signals in the signal type capable of being displayed on the display unit 411. In this manner, the display unit 411 can display two received images on the same display screen by using a picture-in-picture method or the like.

Figure 5:
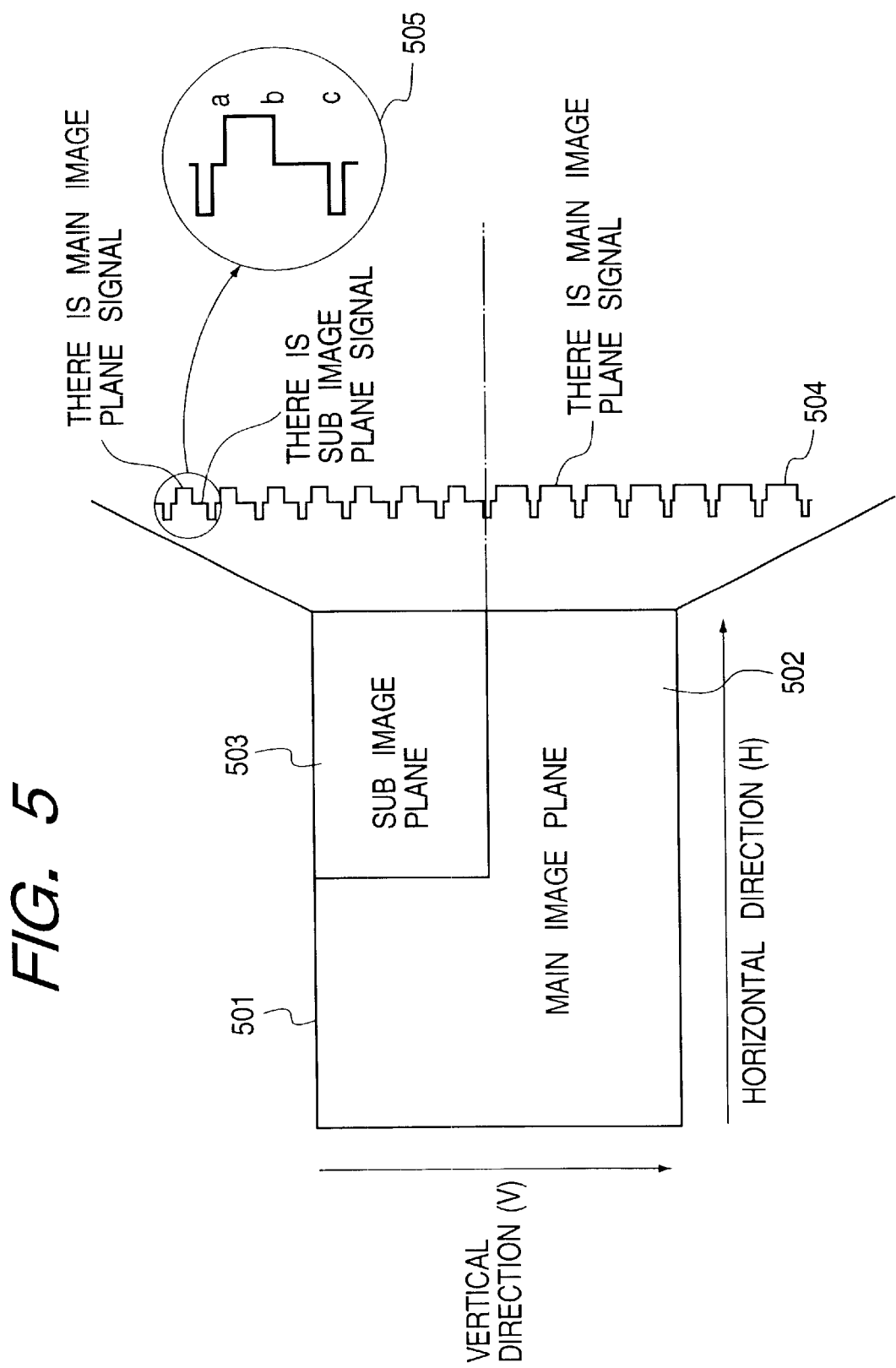
FIG. 5 is a schematic diagram showing an example of a display screen of a display unit 41 of the first embodiment.

FIG. 5 is a schematic diagram showing an example of the display screen of the display unit 411 of the first embodiment.

In FIG. 5, reference numeral 501 represents an effective display area of the display screen of the display unit 411, reference numeral 502 represents an image signal display area of the main image plane, and reference numeral 503 represents an image signal display area of the sub image plane. Reference numeral 504 represents a waveform indicating a main image plane display section and a sub image plane display section, respectively in the horizontal direction, and reference numeral 505 represents an enlarged view of the waveform.

DSP 410C reads digital image signals stored in the memories 410A and 410B in the following manner. In the first section ½ V, the image signals of the main image plane are read from the memory 410A only during a ½ H section (from a to b in FIG. 5). Next, in the remaining ½ H section, the image signals of the sub image plane are read from the memory 410B in the way so that the read image signals match the size of the display area of the sub image plane. Specifically, image signals stored in the memory 410B are read every second pixel in the horizontal direction and every second line in the vertical direction. In the remaining ½ V section, only the image signals of the main image plane stored in the memory 410A are sequentially read.

As above, according to the first embodiment of the invention, of the image signals displayed on the main image plane, the image signals masked by the sub image plane are thinned in advance and thereafter transmitted. The data amount of the image signals of the main image plane to be transmitted from the image transmitting unit 420 to the image receiving unit 422 can be reduced, and the data transmission efficiency can be improved. Since the image signals not displayed by the image receiving unit 422 are not transmitted from the image transmitting unit 420, a transmission power to be consumed can be reduced.

In the first embodiment, the information about the size and position of a display area or each of the main and sub image planes is transmitted from the image receiving unit 422 to the image transmitting unit. The invention is not limited only thereto. For example, the control units A404 and B408 of the image transmitting units each may be provided with a console unit. In this case, by entering a predetermined command from the console unit, the information to be supplied can be manually set. The size and position of each of the main and sub image planes may be set to any fixed values.

Next, the operation of the image transmission system of the first embodiment for transmitting images via a wired or wireless transmission path will be described.

Figure 6:
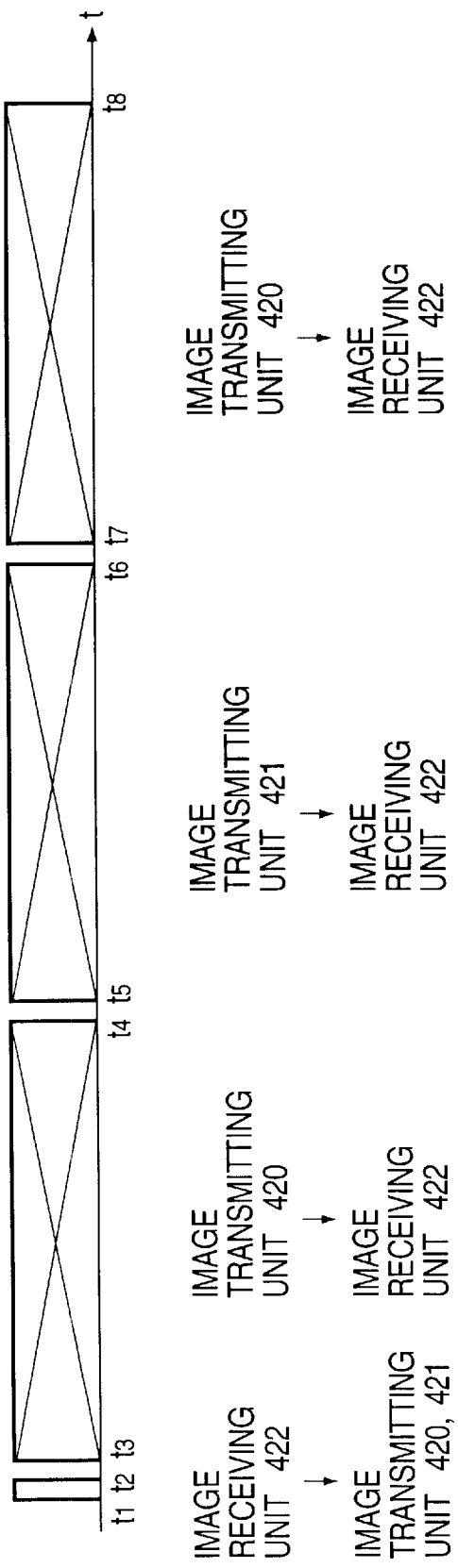
FIG. 6 is a timing chart illustrating the operation of the image transmission system of the first embodiment transmitting an image via a wireless transmission path 412.

FIG. 6 is a timing chart illustrating wireless communications via the transmission path 412 between the image transmitting units 420 and 421 and the image receiving unit 422.

Referring to FIG. 6, the image receiving unit 422 acquires a use right of the transmission path 412, and thereafter notifies each image transmitting unit 420, 421 that which unit transmits image signals of the main image plane, and transmits the image plane setting information (during a period from time t1 to time t2). Next, during a period from time t3 to time t4, the image transmitting unit 420 which transmits image signals of the main image plane transmits a predetermined amount of image signals (e.g., image signals of one frame) to the image receiving unit 422. Next, during a period from time t5 to time t6, the image transmitting unit 421 which transmits image signals of the sub image plane transmits a predetermined amount of image signals to the image receiving unit 422. During a period from time t7 to time t8, the image transmitting unit 420 again transmits image signals of one frame to the image receiving unit 422. In this manner, the image transmitting units 420 and 421 alternately transmit a predetermined amount (e.g., one frame) of image signals through time division multiplex.

Figure 7:
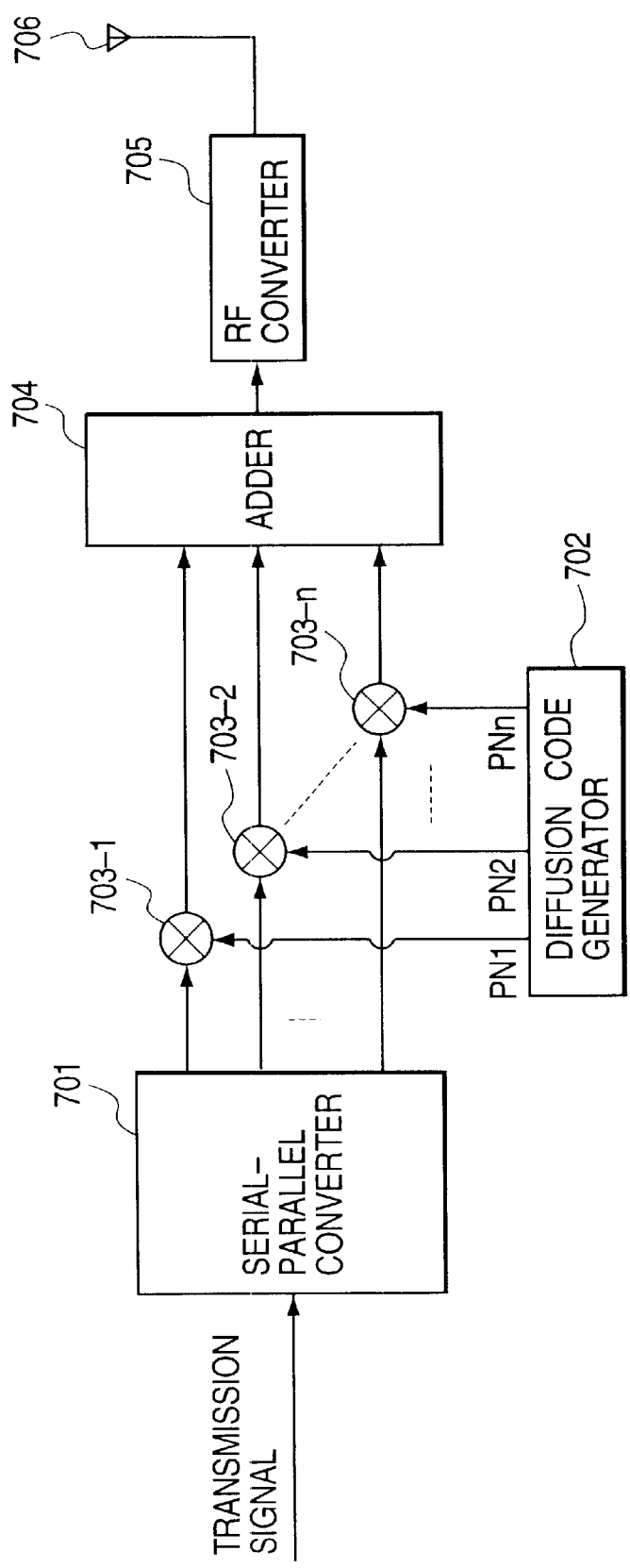
FIG. 7 is a block diagram showing the structure of a transmitting circuit in each of transmitting/receiving units A403, B407 and C409 of the first embodiment.
Figure 8:
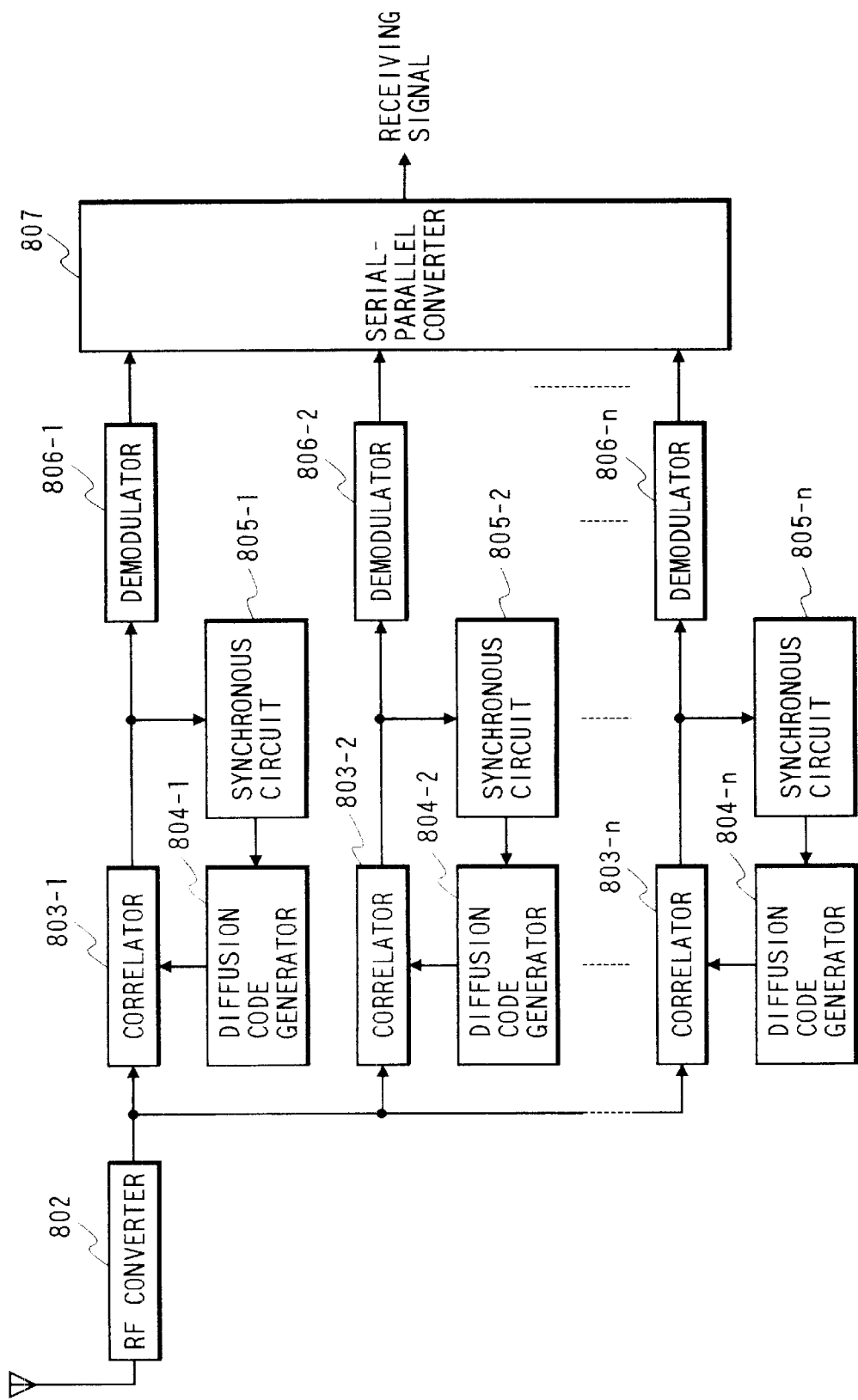
FIG. 8 is a block diagram showing the structure of a receiving circuit in each of transmitting/receiving units A403, B407 and C409 of the first embodiment.

In the image transmission system of this embodiment, a spectrum spreading communications method may be used as specific techniques for realizing such wireless communications. FIG. 7 shows the structure of a transmitting circuit contained in each of the transmitting/receiving units A403, B407 and C409 of the first embodiment. FIG. 8 shows the structure of a receiving circuit contained in each of the transmitting/receiving units A403, B407 and C409 of the first embodiment. The transmitting circuit and receiving circuit of this embodiment perform spectrum spreading communications by using code division multiplex.

Referring to FIG. 7, a serial-parallel converter 701 converts a predetermined amount of image signals supplied from the signal processing unit A402, B406 or the image plane setting information supplied from the image plane control unit 413, into n bit trains. The number of bit trains of the converted image plane setting information is smaller than the number of bit trains of the image signals converted. Each of the n bit trains is supplied to respective n multipliers

703. A spread (diffusion) code generator 702 generates n different spread code series (PN1 to PNn) and supplies them to respective n multipliers 703. Each multiplier 703 multiplies an output of the serial-parallel converter 701 by a corresponding spread code series to spread modulates each bit train. An adder 704 adds together the spread modulated signals output from the n multipliers 703 to multiplex a plurality of spread modulated signals. An RF converter 705 modulates an output of the adder 704 to have a predetermined radio frequency (RF) and transmits it via a transmission antenna 706.

Referring to FIG. 8, an RF converter 802 demodulates a signal received via a reception antenna 801 to have a predetermined frequency. An output of the RF converter 802 is supplied to n correlators 803. Each correlator 803 detects a correlation value of the received signal, by using n different spread code series generated by spread code generators 804. Each of n synchronous circuits 805 synchronizes the operations of each correlator 803 and each spread code generator 804. Each of n demodulators 806 recovers a plurality of bit trains before spread modulated, from outputs of the correlators 803. A parallel-serial converter 807 recovers the image signal before converted by the serial-parallel converter 701, from a plurality of bit trains output from the demodulators 806. The image signal recovered by the parallel-serial converter 807 is supplied to the signal processing unit C410, and the recovered image plane setting information is supplied to the image signal control units A404, B408.

As above, according to the image transmission system of this embodiment, each image transmitting unit 420, 421 can transmit time divisionally the spectrum spread modulated image signals via a wireless transmission path. Although the image transmission system of this embodiment performs wireless communications by using the spectrum spreading method, it is not limitative. For example, this embodiment may be practiced by using a wireless communications method using microwaves or miliwaves.

Figure 9:
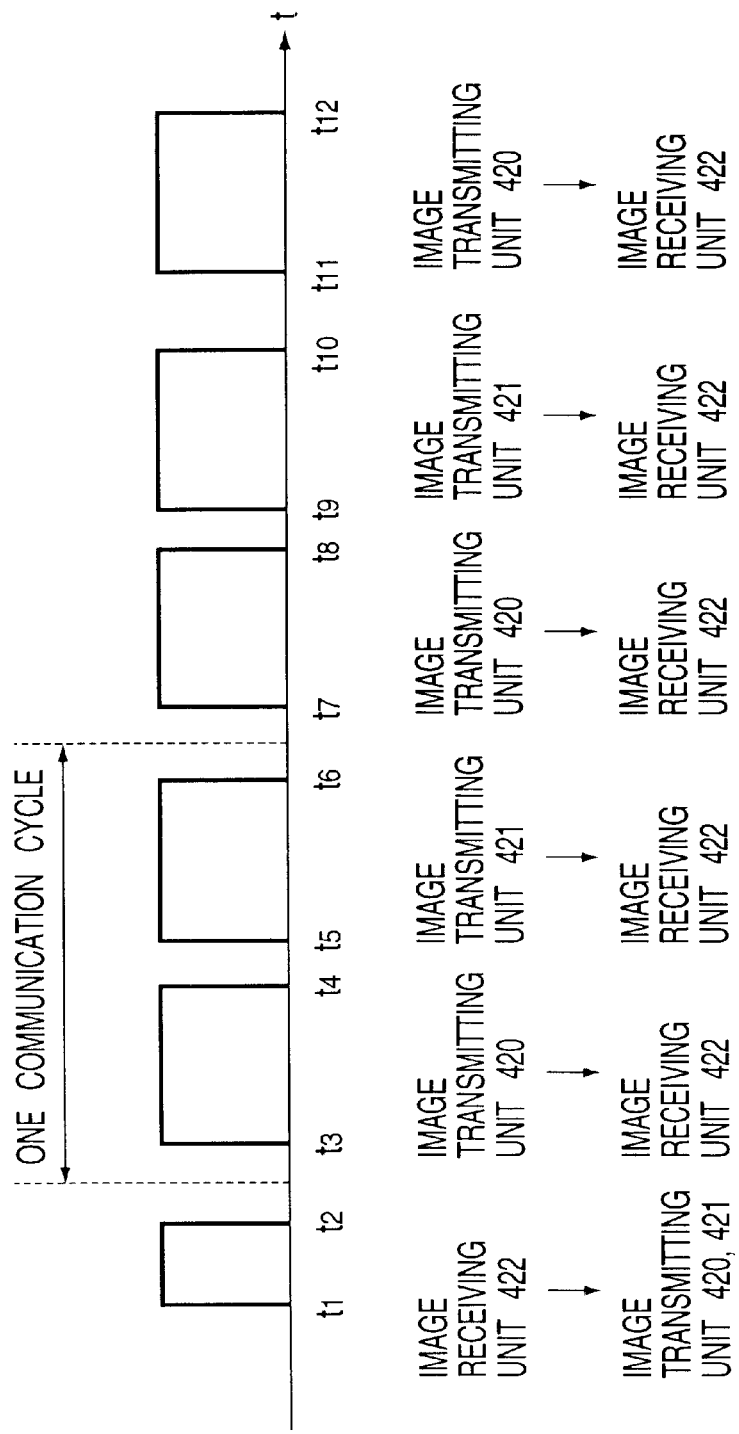
FIG. 9 is a timing chart illustrating the operation of the image transmission system of the first embodiment transmitting an image via a wired transmission path 412.

FIG. 9 is a timing chart illustrating the operation of wired communications between the image transmitting units 420 and 421 and the image receiving unit 422 via the transmission path 412. The wired transmission path is a single bus interconnecting the image transmitting units 420 and 421 and the image receiving unit 422.

Referring to FIG. 9, the image receiving unit 422 acquires a use right of the transmission path 412, and thereafter transmits a packet containing the information indicating that which unit transmits image signals of the main image plane and the image plane setting information, to the image transmitting units 420, 421 (during a period from time t1 to time t2). Next, during a period from time t3 to time t4, the image transmitting unit 420 which transmits a packet containing image signals of the main image plane transmits a predetermined amount of image signals (e.g., image signals of one frame) to the image receiving unit 422. Next, during a period from time t5 to time t6, the image transmitting unit 421 which transmits image signals of the sub image plane transmits a packet containing a predetermined amount of image signals to the image receiving unit 422.

During a period from time t7 to time t8, the image transmitting unit 420 again transmits a packet containing image signals of one frame to the image receiving unit 422. During a period from time t9 to time t10, the image transmitting unit 421 again transmits a packet containing image signals of one frame to the image receiving unit 422. In this manner, the transmitting/receiving units A403, B407 of this embodiment perform time division multiplex communications in each communication cycle by transmitting the packets from the image transmitting units 420 and 421. Each image transmitting unit 420, 421 sequentially outputs a plurality of packets each containing a predetermined amount of image signals synchronously with each cycle period, to thereby transmit in real time the image signals of each unit to the image receiving unit 422. In the image transmission system of this embodiment, high performance serial bus communications techniques such as IEEE 1394-1995 may be used as specific techniques for realizing such wired communications.

Figure 10:
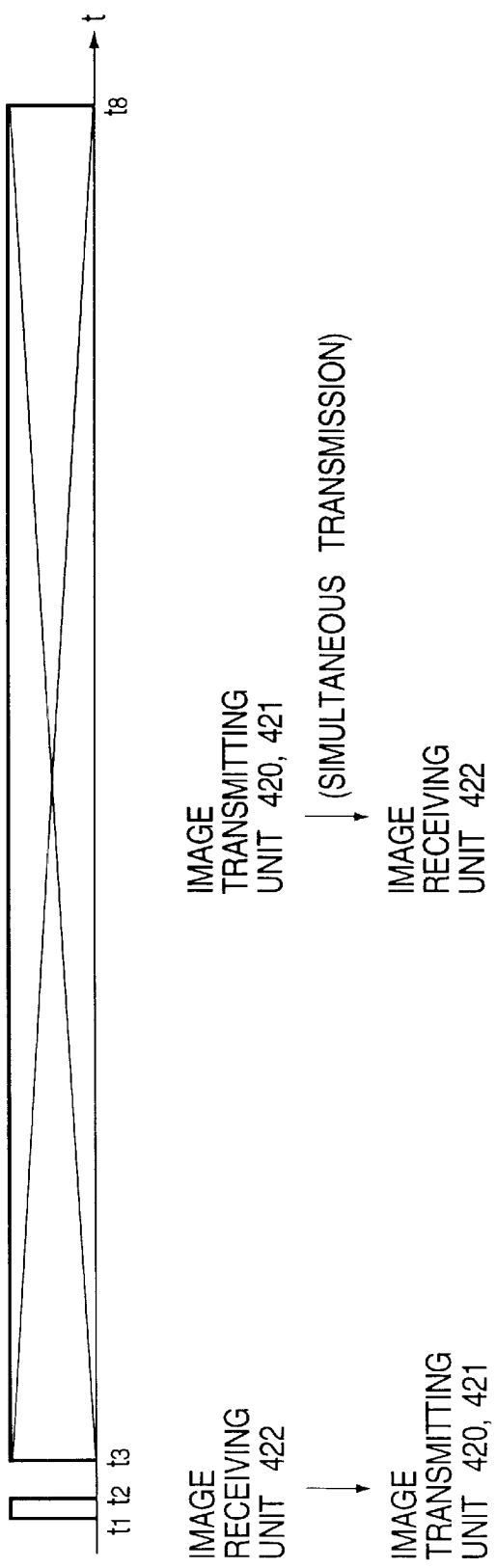
FIG. 10 is a timing chart illustrating the operation of the image transmission system of the first embodiment transmitting images via different wired transmission paths.

As above, in the image transmission system of this embodiment, image signals generated by the image transmitting units 420 and 421 can be transmitted via a wired transmission path, synchronously with a predetermined communications cycle. In the image transmission system of this embodiment, although multiplex communications is performed by using a single bus, this is not limitative. For example, the image transmitting units 420 and 421 may be connected to the image receiving unit 422 via different transmission paths to transmit the image signals generated by the image transmitting units 420 and 421 at the same time to the image receiving unit 422. FIG. 10 is a timing chart illustrating the operation of simultaneous communications by the image transmitting units 420 and 421 using different wired transmission paths.

2. Second Embodiment

Figure 11:
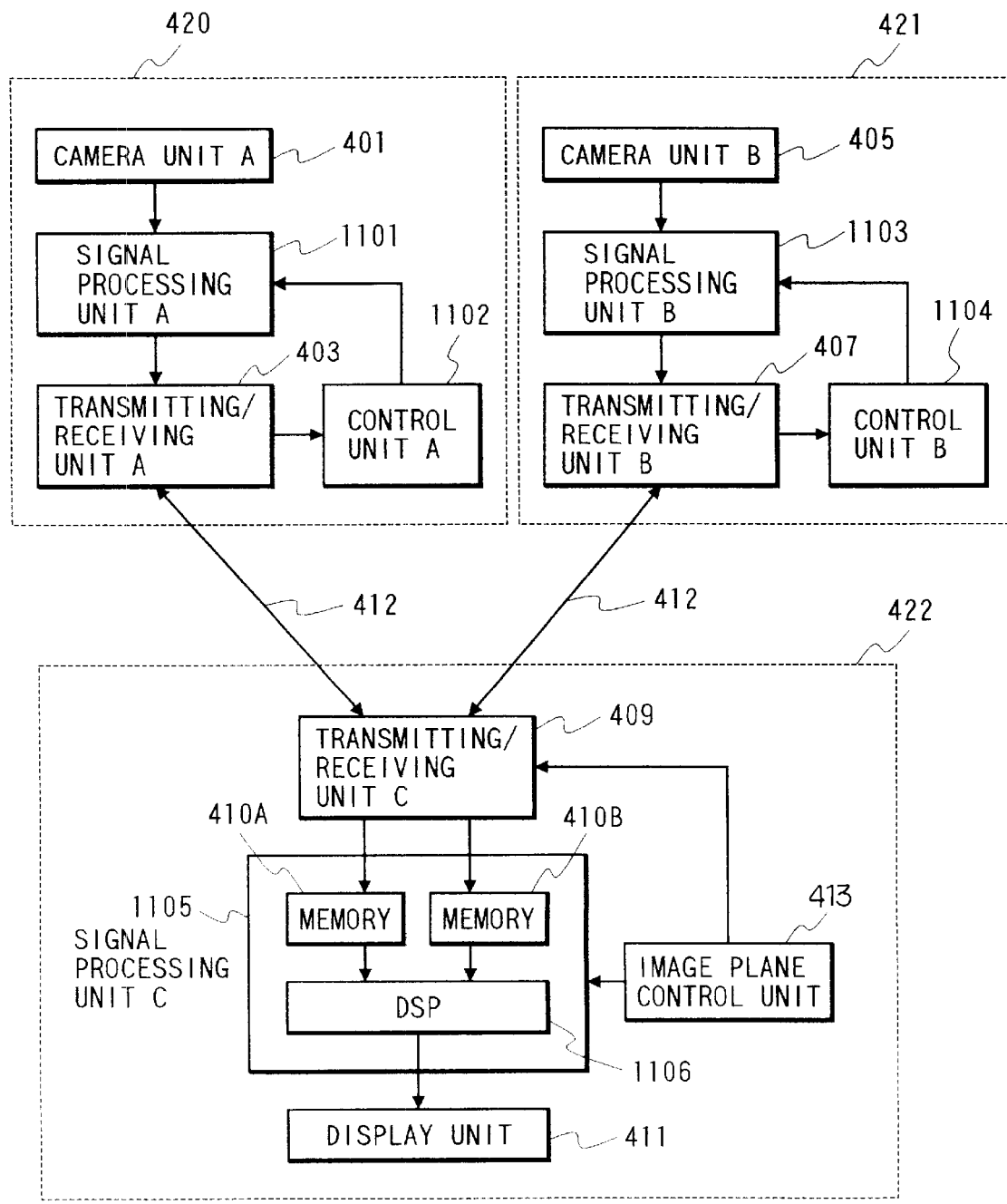
FIG. 11 is a block diagram showing the structure of an image transmission system according to a second embodiment.

FIG. 11 is a block diagram showing the structure of an image transmission system according to the second embodiment of the invention. In this embodiment, elements having the same function and structure as the first embodiment are represented by identical reference numerals and the detailed description thereof is omitted.

In the first embodiment of the invention, the image transmitting unit which transmits image signals of the main image plane transmits the image signals to the image receiving unit 422 after the thinning process for image signals masked by the sub image plane (i.e., after a process of deleting partially or wholly the image signals masked by the sub image plane), and the image transmitting unit which transmits image signals of the sub image plane transmits the image signals to the image receiving unit 422 without the thinning process for the image signals.

In contrast, in the second embodiment of the invention, the image transmitting unit which transmits image signals of the main image plane to the image receiving unit without the thinning process, will be described. Also in the second embodiment, the image transmitting unit which transmits image signals of the sub image plane to the image receiving unit, after a thinning process of thinning the image signals so as to match the size of a display area of the sub image plane.

In the image transmission system of the second embodiment, the image receiving unit 422 determines image signals of which unit among a plurality of image transmitting units are displayed on the main or sub line image plane. Furthermore, the information about the line size and position of a display area of each of the main line and sub image planes is transmitted to a plurality of line image transmitting units from the image receiving unit 422. The determined and set information described above is generated by the image plane control unit 413 of the image receiving unit 422 as the image plane setting information.

In the following, the operation to be executed by the second embodiment of the invention will be described with reference to FIGS. 11 and 12. Similar to the first embodiment, in the second embodiment, it is assumed that the image signal from the image transmitting unit 420 is displayed on the main image plane and the image signal from the image transmitting unit 421 is displayed on the sub image plane. Further, similar to the first embodiment, in the second embodiment, it is assumed that the size of the sub image plane is ¼ that of the main image plane and the display position of the sub image plane is at the upper right of the main image plane. Also in the second embodiment, it is assumed that the size of an image display area of the sub image plane is an integer multiple of the number of coding blocks used for coring the image signal into an image signal having a predetermined format.

Referring to FIG. 11, the image transmitting unit 420 communicates with the image receiving unit 422 via the wired or wireless transmission path 412 to receive the image plane setting information generated by the image plane control unit 413. The image plane setting information received by the transmitting/receiving unit A403 is supplied to a control unit A1102. The control unit A1102 judges from the image plane setting information whether the image signals picked up with the camera unit A401 is displayed on the sub image plane, and in accordance with the judgement results, controls a signal processing unit A1101. In this embodiment, image signals of the image transmitting unit 420 is assumed to be set to the main image plane.

First, the signal processing unit A1101 converts the image signal picked up with the camera unit A401 into a digital signal having a predetermined format, and outputs it to the transmitting/receiving unit A403. As different from the first embodiment, the signal control unit A1101 does not perform a thinning process for image signals to be displayed and superposed upon the sub image plane. The transmitting/receiving unit A403 converts the digitized image signals into image signals suitable for wired or wireless transmission, and transmits the image signals to the image receiving unit 422 via the transmission path 412. Upon reception of this image signal via the transmission path 412 and transmitting/receiving unit C409, the image receiving unit 422 supplies the received image signal to a signal processing unit C1105. In the image transmission system of the second embodiment, wired or wireless communications is performed by using a communications method similar to the first embodiment.

Referring also to FIG. 11, the image transmitting unit 421 communicates with the image receiving unit 422 via the wired or wireless transmission path 412 to receive the image plane setting information generated by the image plane control unit 413. The image plane setting information received by the transmitting/receiving unit B407 is supplied to a control unit B1103. The control unit B1103 judges from the image plane setting information whether the image signals picked up with the camera unit B405 is displayed on the sub image plane, and in accordance with the judgement results, controls a signal processing unit B1103. In this embodiment, image signals of the image transmitting unit 421 is assumed to be set to the sub image plane.

First, the signal processing unit B1103 converts the image signal picked up with the camera unit B405 into a digital signal having a predetermined format, performs a thinning process so as to make the image signals match a display area of the sub image plane. In this embodiment, the display area of the sub image plane is set to ¼ that of the main image plane. Therefore, as different from the first embodiment, the signal processing unit B1103 preforms the thinning process of reducing the number of pixels by a half in the horizontal direction and reducing the pixels every second line in the vertical direction. The transmitting/receiving unit B407 converts the image signals thinned by the image signal processing unit B1103 into image signals suitable for wired or wireless transmission, and transmits the image signals to the image receiving unit 422 via the transmission path 412. Upon reception of this image signal via the transmission path 412 and transmitting/receiving unit C409, the image receiving unit 422 supplies the received image signal to the signal processing unit C1105. In the image transmission system of the second embodiment, wired or wireless communications is performed by using a communications method similar to the first embodiment.

Figure 12:
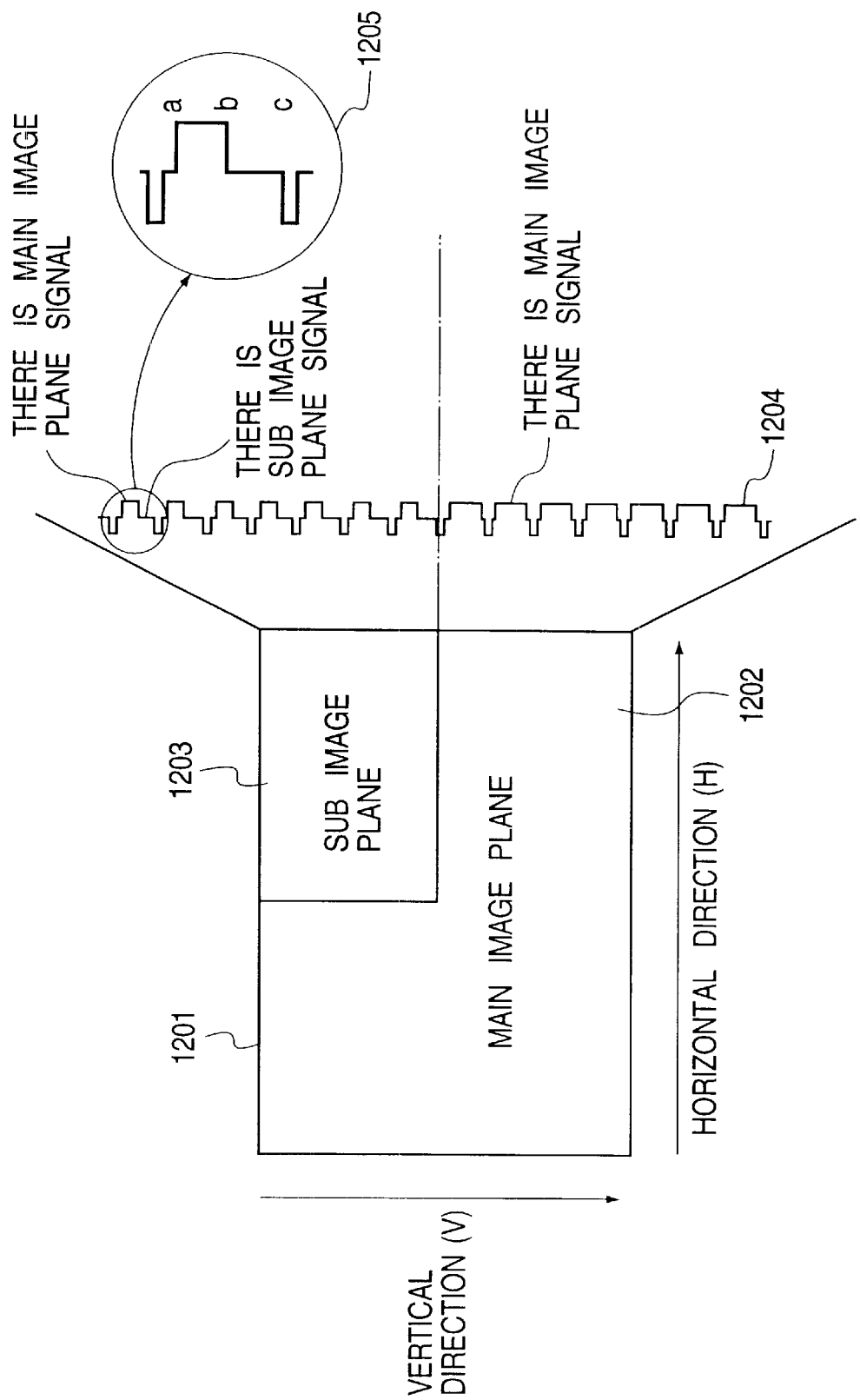
FIG. 12 is a schematic diagram showing an example of a display screen of a display unit 411 of the second embodiment and a third embodiment.

FIG. 12 is a schematic diagram showing an example of the display screen of the display unit 411 of the second embodiment. The signal processing unit C1105 of the image receiving unit 422 controls to store the image signals of the main image plane picked up with the camera unit A401 in the memory 410A and to store the image signals of the sub image plane picked up with the camera unit A405 in the memory 410B. Read control of the memories 410A and 410B is performed as illustrated in FIG. 12.

In FIG. 12, reference numeral 1201 represents an effective display area of the display screen of the display unit 411, reference numeral 1202 represents an image signal display area of the main image plane, and reference numeral 1203 represents an image signal display area of the sub image plane. Reference numeral 1204 represents a waveform indicating a main image plane display section and a sub image plane display section, respectively in the horizontal direction, and reference numeral 1205 represents an enlarged view of the waveform.

DSP 1106 reads digital image signals stored in the memories 410A and 410B in the following manner. In the first section ½ V, the image signals of the main image plane are read from the memory 410A only during a ½ H section, in response to a read clock common to both memories (from a to b in FIG. 12). In the remaining ½ H section, the image signals of the sub image plane are read from the memory 410B in response to the common clock (from b to c in FIG. 12).

Specifically, image signals (for sub image plane) stored in the memory 410B are read every second pixel in the horizontal direction and every second line in the vertical direction. Namely, in the second embodiment, the image signals for the sub image plane are stored in the memory 410B after they are thinned to be suitable for the display on the sub image plane. Therefore, it is sufficient that DSP 1106 reads the image signals from the memory 410B without making them suitable for the size of the sub image plane. In the remaining ½ V section, only the image signals of the main image plane stored in the main memory 410A are sequentially read.

DSP 1106 controls reading the image signals stored in the memories 410A and 410B. DSP 1106 synthesizes images signals into image signals of one frame, and reconfigures the image signals in the signal type capable of being displayed on the display unit 411. In this manner, the display unit 411 can display two received images on the same display screen by using a picture-in-picture method or the like.

As above, according to the second embodiment of the invention, the image signals for the sub image plane are thinned in advance so as to make them match the size of its display area, and thereafter transmitted. Accordingly, the data amount of the image signals of the sub image plane to be transmitted from the image transmitting unit 421 to the image receiving unit 422 can be reduced, and the data transmission efficiency can be improved. Since the image signals thinned so as to match the display area are transmitted from the image transmitting unit 421 to the image receiving unit 422, a transmission power to be consumed can be reduced.

In the second embodiment of the invention, image signals for the main image plane are not thinned, whereas image signals for the sub image plane are thinned so as to match the display area and transmitted to the image receiving unit 422. The invention is not limited only thereto. For example, the image signals for the main image plane may be thinned for the image signals masked by the sub image plane similar to the first embodiment, and thereafter transmitted to the image receiving unit 422. In this case, the image transmission system of the second embodiment can improve further the use efficiency of the transmission path 412 and a transmission power to be consumed by the image transmission unit 420 can be further reduced.

In the second embodiment, the information about the size and position of a display area of each of the main and sub image planes is transmitted from the image receiving unit 422 to the image transmitting unit. This is not limitative. For example, the control units A404 and B408 of the image transmitting units each may be provided with a console unit. In this case, by entering a predetermined command from the console unit, the information to be supplied can be manually set. The size and position of each of the main and sub image planes may be set to any fixed values.

3. Third Embodiment

Figure 13:
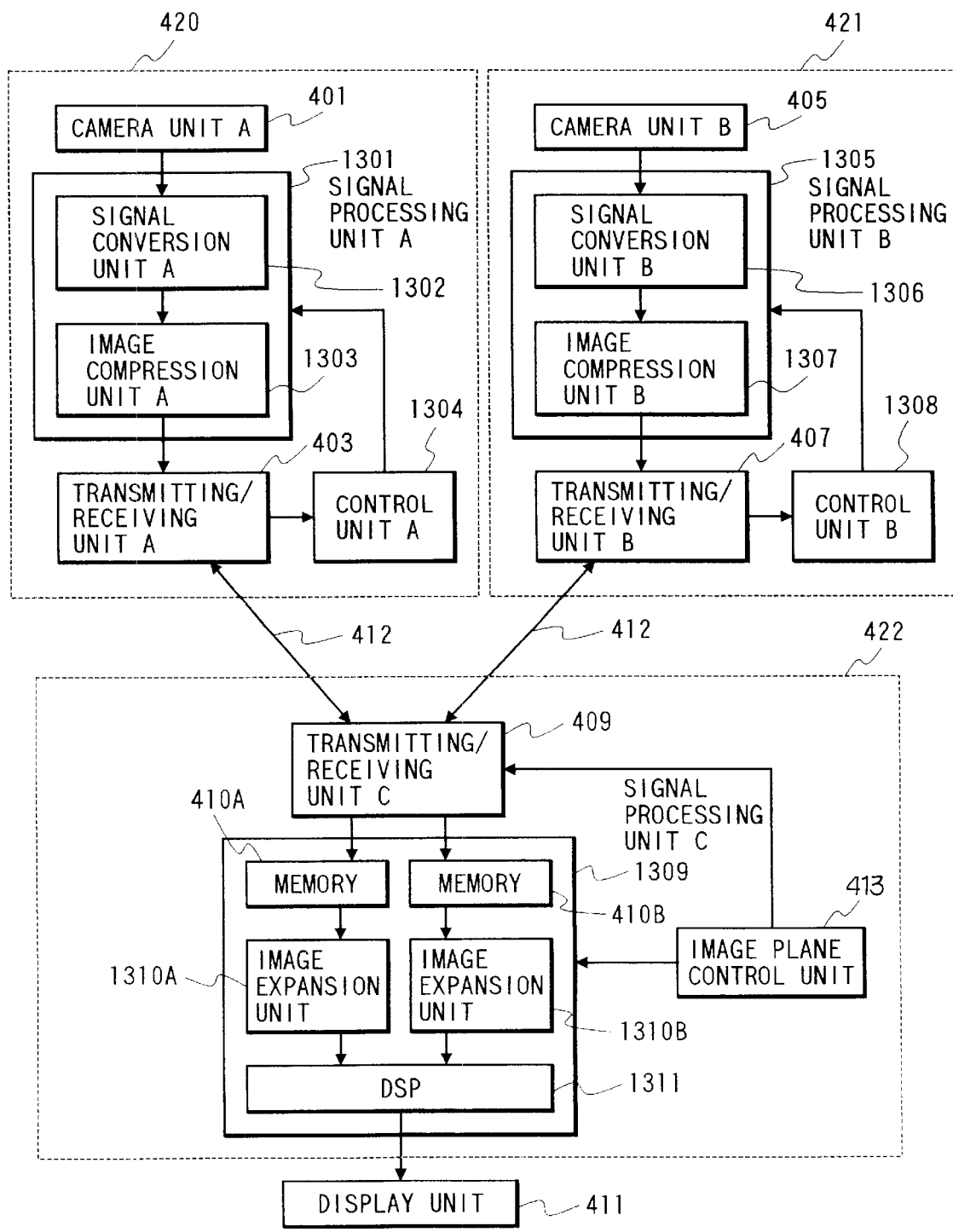
FIG. 13 is a block diagram showing the structure of an image transmission system according to the third embodiment and a fourth embodiment.

FIG. 13 is a block diagram showing the structure of an image transmission system according to the third embodiment of the invention. In this embodiment, elements having the same function and structure as the first and second embodiments are represented by identical reference numerals and the detailed description thereof is omitted.

In the second embodiment of the invention, the image transmitting unit which transmits image signals of the main image plane, transmits the image signals to the image receiving unit 422 without the thinning process. Also in the second embodiment, the image transmitting unit which transmits image signals of the sub image plane, transmits the image signals to the image receiving unit 422 by thinning them so as to match the size of its display area.

In contrast, in the third embodiment of the invention, image signals for the main image plane are not thinned, but they are compression-encoded and thereafter transmitted to the image receiving unit. Further, image signals for the sub image plane are thinned so as to make them match the size of its display area and further compression-encoded to thereafter transmit them to the image transmission unit.

In FIG. 13, reference numeral 420 represents a first image transmitting unit, reference numeral 421 represents a second image transmitting unit, and reference numeral 422 represents an image receiving unit.

In the first image transmitting unit 420, a camera unit A401 is connected to a signal processing unit A1301, the camera unit A401 picking up an optical image of an object and generating a predetermined electrical signal. The signal processing unit A1301 includes a signal conversion unit A1302 and a signal compression unit A1303. The signal conversion unit A1302 digitizes the electrical signal supplied from the camera unit A401 to convert it into an image signal of a predetermined format. The image compression unit A1303 compression-encodes the image signal output from the signal conversion unit A1302 by a predetermined compression encoding method (e.g., a variable length encoding method after orthogonal transformation and quantization).

An output of the signal processing unit A1302 is supplied to the transmitting/receiving unit A403. This transmitting/receiving unit A403 converts the image signal processed by the signal processing unit A1302 into an image signal having a data type suitable for wired or wireless transmission. Similar to the first embodiment, the image signal processed by the transmitting/receiving unit A403 is transmitted via a wired or wireless transmission path 412 to the image receiving unit 422. The transmitting/receiving unit A403 is also connected to a control unit A1304 whose output is supplied to the signal processing unit A1302 and is used for the process control of the signal processing unit A1302.

In the second first image transmitting unit 421, a camera unit B405 is connected to a signal processing unit B1305, the camera unit B405 picking up an optical image of an object and generating a predetermined electrical signal. The signal processing unit B1305 includes a signal conversion unit B1306 and a signal compression unit B1307. The signal conversion unit B1306 digitizes the electrical signal supplied from the camera unit B405 to convert it into an image signal of a predetermined format. The image compression unit B1307 compression-encodes the image signal output from the signal conversion unit B1306 by a predetermined compression encoding method (e.g., a variable length encoding method after orthogonal transformation and quantization).

An output of the signal processing unit B1305 is supplied to the transmitting/receiving unit B407. This transmitting/receiving unit B407 converts the image signal processed by the signal processing unit B1305 into an image signal having a data type suitable for wired or wireless transmission. Similar to the first embodiment, the image signal processed by the transmitting/receiving unit B407 is transmitted via a wired or wireless transmission path 412 to the image receiving unit 422. The transmitting/receiving unit B407 is also connected to a control unit B1308 whose output is supplied to the signal processing unit B1305 and is used for the process control of the signal processing unit B1306.

In the image receiving unit 422, a transmitting/receiving unit C409 receives image signals transmitted from the transmitting/receiving units A403 and B407 via a wired or wireless transmission path. The transmitting/receiving unit C409 is connected to a signal processing unit C1309. This signal processing unit C1309 converts the image signal received by the transmitting/receiving unit C409 into an image signal capable of being displayed on a display unit 411. An output of the signal processing unit C1309 is supplied to the display unit 411. The display unit 411 can display the image signals transmitted from the first and second image transmitting units 420 and 421 on the same display screen. An image plane control unit 413 is connected to the transmitting/receiving unit C409 and to the signal processing unit C1309. The image plane control unit 413 controls the display position of the sub image plane on the display unit 411 and generates the image plane setting information. The image plane setting information is supplied to the transmitting/receiving unit C409 and transmitted to the image transmitting units 420 and 421.

The signal processing unit C1309 includes: a memory 410A for storing image signals received from the image transmitting unit 420 having the camera unit A401; a memory 410B for storing image signals received from the image transmitting unit 421 having the camera unit B405; an image expansion unit 1310A for expanding and decoding the image signal read from the memory 410A when necessary; an image expansion unit 1310B for expanding and decoding the image signal read from the memory 410B when necessary; and a digital signal processor (DSP) 1311 for processing a plurality of image signals read output from the two image expansion units 1310A and 1310B in order to display them on the same display screen.

Next, the operation to be executed by the third embodiment constructed as above will be described. In the third embodiment, it is assumed that the image signal from the image transmitting unit 420 is displayed on the main image plane and the image signal from the image transmitting unit 421 is displayed on the sub image plane. Also in the third embodiment, it is assumed that the size of the sub image plane is ¼ that of the main image plane and the display position of the sub image plane is at the upper right of the main image plane. Also in the third embodiment, it is assumed that the size of an image display area of the sub image plane is an integer multiple of the number of coding blocks used for coring the image signal into an image signal having a predetermined format. Also assumed in the third embodiment is that the image plane control unit 413 determines image signals of which unit among a plurality of image transmitting units are displayed on the main or sub image plane, and also determines the size and position of a display area of each of the main and sub image planes. The determined information is generated by the image plane control unit 413 of the image receiving unit 422 as the image plane setting information.

Referring to FIG. 13, the image transmitting unit 420 communicates with the image receiving unit 422 via the wired or wireless transmission path 412 to receive the image plane setting information generated by the image plane control unit 413. The image plane setting information received by the transmitting/receiving unit A403 is supplied to the control unit A1304. The control unit A1304 judges from the image plane setting information whether the image signals picked up with the camera unit A401 is displayed on the sub image plane, and in accordance with the judgement results, controls the signal processing unit A1301. In this embodiment, image signals of the image transmitting unit 420 is assumed to be set to the main image plane.

The signal conversion unit A1302 of the signal processing unit A1301 converts the image signal picked up with the camera unit A401 into a digital signal having a predetermined format, and supplies it to the image compression unit A1303. The image compression unit A1303 compression-encodes the image signal output from the signal conversion unit A1302 at a predetermined compression factor. The compression factor for the image signal of the main image plane is set lower than that for the image signal of the sub image plane. The compression-encoded image signal is supplied to the transmitting/receiving unit A403. As different from the first embodiment, the signal processing unit A1301 does not perform a thinning process for image signals to be displayed and superposed upon the sub image plane. The transmitting/receiving unit A403 converts the digitized image signals into image signals suitable for wired or wireless transmission, and transmits the image signals to the image receiving unit 422 via the transmission path 412. Upon reception of this image signal via the transmission path 412 and transmitting/receiving unit C409, the image receiving unit 422 supplies the received image signal to the signal processing unit C1309. In the image transmission system of the third embodiment, wired or wireless communications is performed by using a communications method similar to the first embodiment.

Referring also to FIG. 13, the image transmitting unit 421 communicates with the image receiving unit 422 via the wired or wireless transmission path 412 to receive the image plane setting information generated by the image plane control unit 413. The image plane setting information received by the transmitting/receiving unit B407 is supplied to the control unit B1308. The control unit B1308 judges from the image plane setting information whether the image signals picked up with the camera unit B405 is displayed on the sub image plane, and in accordance with the judgement results, controls the signal processing unit B1305. In this embodiment, image signals of the image transmitting unit 421 is assumed to be set to the sub image plane.

First, the signal conversion unit B1306 of the signal processing unit B1305 converts the image signal picked up with the camera unit B405 into a digital signal having a predetermined format, performs a thinning process so as to make the image signals match a display area of the sub image plane. In this embodiment, the display area of the sub image plane is set to ¼ that of the main image plane. Therefore, similar to the second embodiment, the signal conversion unit B1306 preforms the thinning process of reducing the number of pixels by a half in the horizontal direction and reducing the pixels every second lines in the vertical direction.

The image compression unit B1307 compression-encodes the image signals output from the signal conversion unit B1306 at a predetermined compression factor. The compression factor for the image signal of the sub image plane is set higher than that for the image signal of the main image plane. The compression-encoded image signal is supplied to the transmitting/receiving unit B407. The transmitting/receiving unit B407 converts the thinned image signals thinned by the signal processing unit B1305 into image signals suitable for wired or wireless transmission, and transmits the image signals to the image receiving unit 422 via the transmission path 412. Upon reception of this image signal via the transmission path 412 and transmitting/receiving unit C409, the image receiving unit 422 supplies the received image signal to the signal processing unit C1309. In the image transmission system of the third embodiment, wired or wireless communications is performed by using a communications method similar to the first embodiment.

The signal processing unit C1309 of the image receiving unit 422 controls to store the image signals picked up with the camera unit A401 in the memory 410A and to store the image signals picked up with the camera unit B405 in the memory 410B. The image signals stored in the memories 410A and 410B are expansion-decoded by the image expansion units 1310A and 1310B and supplied to DSP 1311. DSP 1311 reads the image signals from the memories, synchronously with a clock used in common for both the memories, so as to display the image signals on the same display screen. The process to be executed by DSP 1311 of the third embodiment will be described with reference to FIG. 12.

Referring to FIG. 12, in the first section ½ V, the image signals of the main image plane are read from the memory 410A only during a ½ H section (from a to b in FIG. 12). In the remaining ½ H section, the image signals of the sub image plane are read from the memory 410B (from b to c in FIG. 12).

Specifically, image signals (for sub image plane) stored in the memory 410B are read every second pixels in the horizontal direction and every second lines in the vertical direction. Namely, in the third embodiment, the image signals for the sub image plane are stored in the memory 410B after they are thinned to be suitable for the display on the sub image plane. Therefore, it is sufficient that DSP 1311 reads the image signals from the memory 410B without making them suitable for the size of the sub image plane. In the remaining ½ V section, only the image signals of the main image plane stored in the main memory 410A are sequentially read.

DSP 1311 synthesizes images signals read from the memories 410A and 410B into image signals of one frame, and reconfigures the image signals in the signal type capable of being displayed on the display unit 411. In this manner, the display unit 411 can display two received images on the same display screen by using a picture-in-picture method or the like.

As above, similar to the second embodiment, according to the third embodiment of the invention, the image signals for the sub image plane are thinned in advance so as to make them match the size of its display area, and thereafter transmitted. Accordingly, the data amount of the image signals of the sub image plane to be transmitted from the image transmitting unit 421 to the image receiving unit 422 can be reduced, and the data transmission efficiency can be improved. Since the image signals thinned so as to match the display area are transmitted from the image transmitting unit 421 to the image receiving unit 422, a transmission power to be consumed can be reduced.

In the third embodiment, although the compression factor for the image signals of the sub image plane is set higher than that for the image signals of the main image plane, this is not limitative. For example, each of the control unit A1304 and B1308 of the image transmitting units may control variably the compression factor for the image signals of the sub image plane, in accordance with the size of a display area of the sub image plane.

Also in the third embodiment, the information about the size and position of a display area of each of the main and sub image planes is transmitted from the image receiving unit 422 to the image transmitting unit. This is not limitative. For example, the control units A1304 and B1308 of the image transmitting units each may be provided with a console unit. In this case, by entering a predetermined command from the console unit, the information to be supplied can be manually set. The size and position of each of the main and sub image planes may be set to any fixed values.

Also in the third embodiment of the invention, image signals for the main image plane are not thinned, whereas image signals for the sub image plane are thinned so as to match the display area and transmitted to the image receiving unit 422. The invention is not limited only thereto. For example, the image signals for the main image plane may be thinned for the image signals masked by the sub image plane similar to the first embodiment, and thereafter transmitted to the image receiving unit 422. In this case, the image transmission system of the third embodiment can improve further the use efficiency of the transmission path 412 and a transmission power to be consumed by the image transmission unit 420 can be further reduced.

4. Fourth Embodiment

The fourth embodiment of the invention will be described with reference to the image transmission system shown in FIG. 13.

In the third embodiment of the invention, the image transmitting unit which transmits image signals of the main image plane to the image receiving unit, compression-encodes the image signal without a thinning process of reducing the image signals in the display area overlapped with the sub image plane, whereas the image transmitting unit which transmits image signals of the sub image plane to the image receiving unit, compression-encodes the image signal after a thinning process of reducing the image signals of the sub image plane.

In contrast, in the fourth embodiment of the invention, prior to transmitting the image signals of the main image plane to the image receiving unit, the image transmitting unit reduces the amount of the image signals overlapped with the sub image plane and thereafter compression-encodes the reduced image signals, whereas prior to transmitting the image signals of the sub image plane, the image transmitting unit converts the image signals into image signals suitable for the size of the sub image plane and thereafter compression-encodes the converted image signals.

In the fourth embodiment, the image plane control unit 413 determines image signals of which unit among a plurality of image transmitting units are displayed on the main or sub image plane, and also determines the size and position of a display area of each of the main and sub image planes. The determined information is generated by the image plane control unit 413 of the image receiving unit 422 as the image plane setting information. Also in the fourth embodiment, similar to the third embodiment, the image signals of the main image plane are transmitted from the image transmitting unit 420. Similar to the third embodiment, it is assumed that the size-of the sub image plane is ¼ that of the main image plane and the display position of the sub image plane is at the upper right of the main image plane. Also in the fourth embodiment, it is assumed that the size of an image display area of the sub image plane is an integer multiple of the number of coding blocks used for coring the image signal into an image signal having a predetermined format.

Referring to FIG. 13, the image transmitting unit 420 receives via the transmission path 412 the image plane setting information generated by the image plane control unit 413. The signal conversion unit A1302 of the signal processing unit A1301 converts the image signal picked up with the camera unit A401 into a digital signal having a predetermined format, and performs a thinning process of reducing the image signals in a display area overlapped with the sub image plane. Instead of this thinning process, the signal conversion unit A1302 may reduce the amount of image signals by a different method. The image compression unit A1303 compression-encodes the image signal output from the signal conversion unit A1302 at a predetermined compression factor. The compression factor for the image signal of the main image plane is set lower than that for the image signal of the sub image plane. The compression-encoded image signal is supplied to the transmitting/receiving unit A403. The transmitting/receiving unit A403 transmits the digitized image signals to the image receiving unit 422. The image receiving unit 422 supplies the image signal received via the transmission path 412 and transmitting/receiving unit C409, to the signal processing unit C1309. In the image transmission system of the fourth embodiment, wired or wireless communications is performed by using a communications method similar to the first embodiment.

Referring also to FIG. 13, the image transmitting unit 420 receives via the transmission path 412 the image plane setting information generated by the image plane control unit 413. The signal conversion unit B1306 of the signal processing unit B1305 converts the image signal picked up with the camera unit B405 into a digital signal having a predetermined format, and performs a thinning process of reducing the image signals in a display area overlapped with the sub image plane so as to broaden the display area slightly. The image compression unit B1307 compression-encodes the image signal output from the signal conversion unit B1306 at a predetermined compression factor. The compression factor for the image signal of the sub image plane is set higher than that for the image signal of the main image plane. The transmitting/receiving unit B407 transmits the compression-encoded image signal thinned by the signal processing unit B1305 to the image receiving unit 422. The image receiving unit 422 supplies the image signal received via the transmission path 412 and transmitting/receiving unit C409, to the signal processing unit C1309. In the image transmission system of the fourth embodiment, wired or wireless communications is performed by using a communications method similar to the first embodiment.

The signal processing unit C1309 of the image receiving unit 422 controls to store the image signals picked up with the camera unit A401 in the memory 410A and to store the image signals picked up with the camera unit B405 in the memory 410B. The image signals stored in the memories 410A and 410B are expansion-decoded by the image expansion units 1310A and 1310B and supplied to DSP 1311. DSP 1311 reads the image signals from the memories, synchronously with a clock used in common for both the memories, so as to display the image signals on the same display screen. The image signals (for the sub image plane) stored in the memory 410B correspond to image signals converted by the image transmitting unit 421 so as to provide a display area slightly broader than the actual display area.

Figure 14:
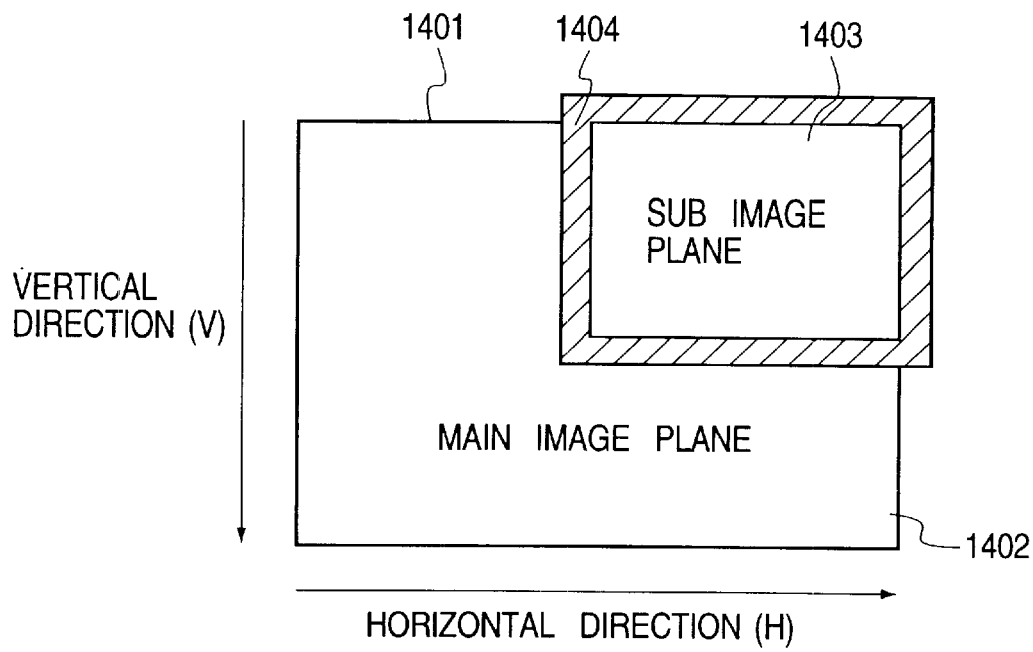
FIG. 14 is a schematic diagram showing an example of a display screen of a display unit 411 of the fourth embodiment.

FIG. 14 is a schematic diagram showing an example of a display screen of the display unit 411 of the fourth embodiment. In FIG. 14, a main image plane 1402 and a sub image plane 1403 are displayed in an overlap manner in an effective display area 1401 of the display unit 411. Reference numeral 1404 represents the size of the image signals of the sub image plane transmitted from the image transmitting unit 421, which size is larger than the actually displayed sub image plane 1403.

DSP 1311 reads the image signals stored in the memory 410B so as to match the size of the actual display area of the sub image plane, and synthesizes it with the image signals of the main image plane. It is therefore possible for the image receiving unit 422 of this embodiment to eliminate stresses to be otherwise formed at a boundary 1504 between the main and sub image planes. Although the amount of image signals of the sub image to be transmitted increases slightly, disturbance of the image at the boundary 1504 between the main and sub image planes can be suppressed. DSP 1311 is so designed that it reads the image signals stored in the memory 410B with the priority over the other memory so as to eliminate stresses in the image at the boundary 1504.

As above, DSP 1311 synthesizes images signals read from the memories 410A and 410B into image signals of one frame, and reconfigures the image signals in the signal type capable of being displayed on the display unit 411. In this manner, the display unit 411 can display two received images on the same display screen by using a picture-in-picture method or the like.

As above, in the fourth embodiment of the invention, the image signals of the main image plane masked by the sub image plane are thinned in advance and thereafter transmitted. Accordingly, the data amount of the image signals of the main image plane to be transmitted from the image transmitting unit 421 to the image receiving unit 422 can be reduced, and the data transmission efficiency can be improved. Since the image transmitting unit 420 can reduce the amount of the image signals not displayed on the side of the image receiving unit 422, a transmission power to be consumed can be reduced.

As above, in the fourth embodiment of the invention, the image signals for the sub image plane to be overlapped with the main image plane are thinned in advance so as to make them slightly broader than its display area, and thereafter transmitted. Accordingly, the data amount of the image signals of the sub image plane to be transmitted from the image transmitting unit 421 to the image receiving unit 422 can be reduced, and the data transmission efficiency can be improved. Since the image signals thinned so as to match the display area are transmitted from the image transmitting unit 421 to the image receiving unit 422, a transmission power to be consumed can be reduced. Further, since the image receiving unit 422 receives the image signals corresponding to a display area slightly broader than the actual display area, image deterioration at the boundary between the main and sub image planes can be suppressed.

The invention may be embodied in other specific forms without departing from the spirit or essential characteristics thereof.

For example, in the first to fourth embodiments, image signals transmitted from the image transmitting unit 420 is displayed on the main image plane, whereas image signals transmitted from the image transmitting unit 421 is displayed on the sub image plane. This is not limitative, but contrary to the embodiments, image signals transmitted from the image transmitting unit 421 may be displayed on the main image plane, whereas image signals transmitted from the image transmitting unit 420 may be displayed on the sub image plane.

Also in the first to fourth embodiments, two image transmitting units are used for transmitting image signals to the image receiving unit 422. This is not limitative, but two or more image transmitting units may be used for displaying the image signals on the same display screen. In this case, image signals transmitted from one image transmitting unit are displayed on the main image plane, and image signals transmitted from a plurality of image receiving units are displayed on a plurality of sub image planes.

Also in the first to fourth embodiments, the image transmitting unit for transmitting image signals of the main image plane transmits them after thinning image signals masked by the sub image plane, and thereafter transmits image signals of a different display area. This is not limitative, but the image signals masked by the sub image plane may be converted into image signals having a predetermined format and the data amount smaller than the original image signals and transmitted together with the image signals of a different display area to the image receiving unit. In this case, image signals in the display area to be masked are converted into image signals displayed in blue or grey or image signals synthesized with those pixels around the display area to be masked. In either case, the data amount of converted image signals is made smaller than the original image signals.

Figure 15:
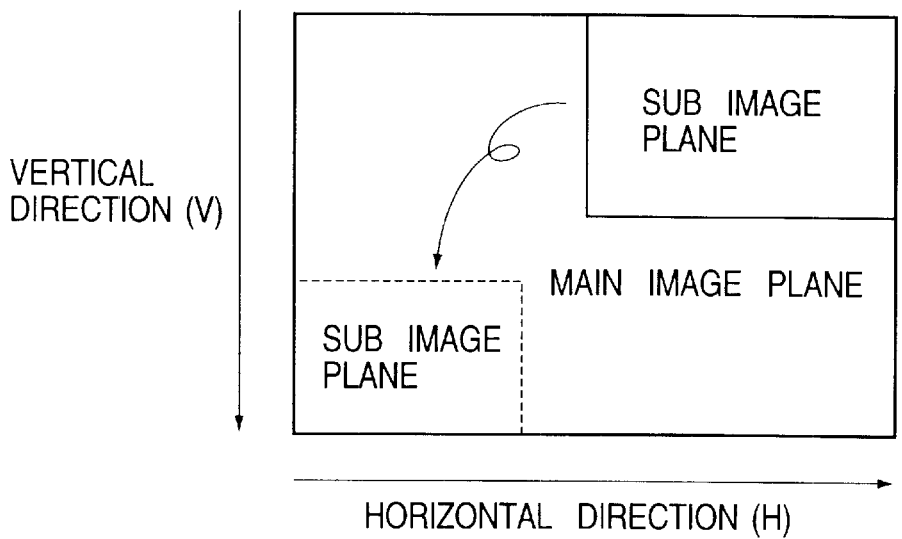
FIG. 15 is a schematic diagram showing another example of a display screen of the display unit 411 of the fourth embodiment.

Also in the first to fourth embodiments, the position of the sum image plane is located at the upper right in the main image plane in an overlap manner. This is not limitative. For example, as shown in FIG. 15, the position of the sum image plane may be located at the lower left in the main image plane in an overlap manner. The position of the sub image plane is set by the image plane control unit 413 of the image receiving unit 422, and the new image plane setting information is transmitted to each image transmitting unit 420, 421.

Also in the first to fourth embodiments, the size of the sub image plane is set to ¼ that of the main image plane. This is not limitative. For example, as shown in FIG. 15, the size of the sub image plane may be set smaller than ¼ that of the main image plane. The size of the sub image plane is set by the image plane control unit 413 of the image receiving unit 422, and the new image plane setting information is transmitted to each image transmitting unit 420, 421.

Also in the first to fourth embodiments, the image receiving unit 422 sets information about the size and position of a sub image plane and transmits the information to a plurality of image transmitting units. This is not limitative. For example, a plurality of image transmitting units may set the size and position of each of the main and sub image planes to the image receiving unit 422, prior to transmitting image signals.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An image transmitting system, comprising:
   (a) a first image transmitting apparatus which transmits a first image to be displayed on a main image plane;
   (b) a second image transmitting apparatus which transmits a second image to be displayed on a sub-image plane; and
   (c) a display control apparatus which transmits setting information including information about the main and the sub-image planes to said first and second image transmitting apparatuses, with said first image transmitting apparatus comprising:
      a receiver which receives the setting information from said display control apparatus, and
      an image processor which detects an overlapping area between the main and sub-image planes based on the setting information, and deletes a partial or an entire image in the detected overlapping area from the first image.

2. A system according to claim 1, wherein the setting information includes information about a size of the main and sub-image planes, and information about a position of the main and sub-image planes.

3. A system according to claim 2, wherein said first and second image transmitting apparatuses transmit the first and second images to said display control apparatus via a wireless communication path.

4. A system according to claim 3, wherein said first and second image transmitting apparatuses transmit the first and second images to said display control apparatus using a spread spectrum communication system.

5. A system according to claim 2, wherein said first and second image transmitting apparatuses transmit the first and second images to said display control apparatus via a wired communication path.

6. A system according to claim 5, wherein said first and second image transmitting apparatuses transmit the first and second images to said display control apparatus using a serial bus communication system.

* * * * *

UNITED STATES PATENT AND TRADEMARK OFFICE
CERTIFICATE OF CORRECTION

PATENT NO.    : 6,417,886 B1
DATED         : July 9, 2002
INVENTOR(S)   : Motoi Tariki It is certified that error appears in the above-identified patent and that said Letters Patent is hereby corrected as shown below:

Column 12,
Lines 57 and 58, "line" should be deleted.

Column 18,
Lines 19 and 60, "lines" should read -- line --; and
Line 59, "pixels" should read -- pixel --.

Column 20,
Line 22, "size-of" should read -- size of --.

Signed and Sealed this

Twenty-second Day of April, 2003

JAMES E. ROGAN
*Director of the United States Patent and Trademark Office*